US009261589B2

United States Patent
Itoh et al.

(10) Patent No.: US 9,261,589 B2
(45) Date of Patent: Feb. 16, 2016

(54) SIGNAL PROCESSING DEVICE, RADAR DEVICE, VEHICLE CONTROL SYSTEM, AND SIGNAL PROCESSING METHOD

(75) Inventors: Jun Itoh, Kobe (JP); Masayuki Kishida, Kobe (JP)

(73) Assignee: FUJITSU TEN LIMITED, Hyogo (JP)

( * ) Notice: Subject to any disclaimer, the term of this patent is extended or adjusted under 35 U.S.C. 154(b) by 246 days.

(21) Appl. No.: 13/807,092

(22) PCT Filed: Jun. 23, 2011

(86) PCT No.: PCT/JP2011/064411
§ 371 (c)(1),
(2), (4) Date: Dec. 27, 2012

(87) PCT Pub. No.: WO2012/002251
PCT Pub. Date: Jan. 5, 2012

(65) Prior Publication Data
US 2013/0093613 A1   Apr. 18, 2013

(30) Foreign Application Priority Data

Jun. 30, 2010   (JP) ................................ 2010-148806

(51) Int. Cl.
*G01S 13/93*   (2006.01)
*G01S 13/04*   (2006.01)
(Continued)

(52) U.S. Cl.
CPC ............... *G01S 13/04* (2013.01); *G01S 13/345* (2013.01); *G01S 13/584* (2013.01); *G01S 13/931* (2013.01);
(Continued)

(58) Field of Classification Search
CPC ... G01S 13/931; G01S 13/345; G01S 13/584; G01S 13/04; G01S 2013/9321; G01S 2013/9346; G01S 2013/935; G01S 2013/9353; G01S 2013/9375

USPC ..................................................... 342/70–72
See application file for complete search history.

(56) References Cited

U.S. PATENT DOCUMENTS 6,011,507 A *   1/2000   Curran et al. .................... 342/70
6,731,235 B2 *   5/2004   Kishida et al. ................. 342/128
(Continued)

FOREIGN PATENT DOCUMENTS

JP   A-2002-236170   8/2002
JP   A-2003-167047   6/2003
(Continued)

OTHER PUBLICATIONS

Office Action issued in Japanese Patent Application No. 2010-148806 dated May 20, 2014 (with partial translation).
(Continued)

*Primary Examiner* — John B Sotomayor
*Assistant Examiner* — Marcus Windrich
(74) *Attorney, Agent, or Firm* — Oliff PLC

(57) ABSTRACT

There is provided a signal processing device. Data indicative of a past sensing point, and a counter value indicative of existence possibility of the past sensing point are stored in a storage. Whether the past sensing point has continuity to a recent sensing point is determined. The counter value associated with the past sensing point determined as having no continuity to the recent sensing point is decreased. The data is deleted from the storage means when the counter value becomes less than a first threshold value. The sensing point possibly detected by pairing peak signals obtained in first and second periods in a wrong manner is identified as a specific sensing point. A first value is decreased from the counter value associated with the past sensing point, and a second value different from the first value is decreased from the counter value associated with the specific sensing point.

5 Claims, 12 Drawing Sheets

(51) Int. Cl.
*G01S 13/34* (2006.01)
*G01S 13/58* (2006.01)

(52) U.S. Cl.
CPC ... *G01S 2013/935* (2013.01); *G01S 2013/9321* (2013.01); *G01S 2013/9346* (2013.01); *G01S 2013/9353* (2013.01); *G01S 2013/9375* (2013.01); *G01S 2013/9378* (2013.01); *G01S 2013/9385* (2013.01)

(56) References Cited

U.S. PATENT DOCUMENTS

| | | | |
|---|---|---|---|
| 6,856,278 B2 * | 2/2005 | Nakanishi et al. | 342/128 |
| 6,888,494 B2 * | 5/2005 | Tamatsu et al. | 342/128 |
| 6,970,129 B2 * | 11/2005 | Kumon et al. | 342/70 |
| 8,446,312 B2 * | 5/2013 | Kanamoto et al. | 342/149 |
| 2004/0108952 A1 * | 6/2004 | Ishii et al. | 342/174 |
| 2007/0040731 A1 * | 2/2007 | Kishida | 342/109 |
| 2010/0033365 A1 * | 2/2010 | Kishida et al. | 342/70 |
| 2010/0214153 A1 * | 8/2010 | Kikuchi | 342/70 |
| 2011/0050481 A1 * | 3/2011 | Itoh et al. | 342/27 |
| 2011/0205102 A1 * | 8/2011 | Shibata et al. | 342/70 |

FOREIGN PATENT DOCUMENTS

| | | |
|---|---|---|
| JP | A-2004-17763 | 1/2004 |
| JP | A-2004-53611 | 2/2004 |
| JP | A-2004-226121 | 8/2004 |
| JP | A-2008-51614 | 3/2008 |
| JP | A-2010-175256 | 8/2010 |

OTHER PUBLICATIONS

International Search Report issued in International Patent Application No. PCT/JP2011/064411 dated Aug. 2, 2011.

International Preliminary Report on Patentability issued in International Patent Application No. PCT/JP2011/064411 dated Jan. 8, 2013 (with translation).

Office Action issued in Japanese Patent Application No. 2010-148806 dated Jun. 25, 2013 (with translation).

* cited by examiner

SIGNAL PROCESSING DEVICE, RADAR DEVICE, VEHICLE CONTROL SYSTEM, AND SIGNAL PROCESSING METHOD

TECHNICAL FIELD

The present invention relates to a technology to detect an object based on information of a transmission wave and a reception wave.

BACKGROUND ART

In a case of detecting an object using a radar device, a transmitting signal that is obtained from a transmission wave and a receiving signal that is obtained from a reception wave are mixed, and a relative distance and a relative speed of the object are detected from a peak signal that is detected by a frequency difference between the transmitting signal and the receiving signal. Here, the peak signal means a frequency spectrum having a signal strength that is equal to or higher than a predetermined value.

Further, in a case of detecting the object based on an FM-CW method, peak signals are extracted from an up period and a down period of a transmitting signal and a receiving signal, and a sensing point having parameters of the relative distance and the relative speed of the object is detected through combination of the peak signals in the up period and the down period. Here, the combination of the peak signals is determined by the speed of a vehicle having a radar device, the signal strength of the peak signal, and angle information. Further, a continuity determination process is performed to detect whether a recently detected sensing point is the sensing point of the same object as that of the past sensing point detected in the past and whether this sensing point has been continually detected multiple times, and if the sensing point has been continually detected over a predetermined number of times as the result of the determination, data of the latest sensing point is stored in a memory provided in the radar device.

Further, even in a case where the continually detected sensing point is not detected any further, an extrapolation process is performed to update the data of the sensing point under the assumption that the sensing point exists in a specific position from the position or speed information of the latest sensing point that was detected just before the sensing point is not detected any further, rather than to immediately delete the data of the sensing point from the memory (for example, see Japanese Unexamined Patent Application Publication No. 2004-53611). Further, if the sensing point, which corresponds to the sensing point updated in the extrapolation process, is detected through the next scanning, a process to store the corresponding sensing point in the memory as data of the latest sensing point by overwriting the data of the corresponding sensing point on the data of the sensing point updated in the extrapolation process. The data of the sensing point obtained through the extrapolation process is output to a vehicle control device that is targeted for vehicle control.

SUMMARY OF THE INVENTION

Problems to Be Solved by Invention

However, if the extrapolation process is performed with respect to the sensing point that is detected through a wrong (mis-paired) combination of the peak signal in the up period and the peak signal in the down period and the wrong sensing point is continually output to the vehicle control device as the data of the sensing point, there is a possibility that an improper vehicle control is performed based on a non-existing sensing point.

Accordingly, the present invention has been made in consideration of the above-described situations, and an object of the present invention is to properly process data of a sensing point which may be detected due to a wrong combination of peak signals.

Means for Solving Problems

In order to achieve the above object, according to the present invention, those listed below may be provided.

(1) A signal processing device configured to perform object detection processing for obtaining a peak signal indicative of a frequency difference between a transmitting signal of which a frequency is cyclically varying and a receiving signal obtained by receiving a reflection wave from an object which reflects a transmission wave based on the transmission signal, for each of a first period in which the frequency of the transmission signal is increasing and a second period in which the frequency is decreasing, and for pairing the peak signal obtained in the first period and the peak signal obtained in the second period, thereby detecting a sensing point indicative of a reflection point on the object associated with the peak signals, the signal processing device comprising: storage means for storing data indicative of a past sensing point which is the sensing point detected in the object detection processing performed in the past, and a counter value indicative of existence possibility of the past sensing point; determination means for determining whether the past sensing point has continuity to a recent sensing point which is the sensing point detected in the object detection processing performed lately; decrement means for decreasing the counter value associated with the past sensing point determined by the determination means as having no continuity to the recent sensing point; deletion means for deleting, from the storage means, the data indicative of the past sensing point associated with the counter value when the counter value become less than a first threshold value; and identification means for identifying as a specific sensing point the sensing point possibly detected by pairing the peak signal obtained in the first period and the peak signal obtained in the second period in a wrong manner, wherein the decrement means decreases a first value from the counter value associated with the past sensing point, and decreases a second value different from the first value from the counter value associated with the specific sensing point.

(2) The signal processing device according to (1), wherein the second value is larger than the first value.

(3) The signal processing device according to (1) or (2), further comprising: increment means for increasing the counter value associated with the past sensing point determined by the determination means as having the continuity to the recent sensing point; and output means for, in a case where the counter value increased by the increment means is no less than a second threshold value which is larger in value than the first threshold value, outputting object data which includes information of the sensing point associated with the counter value and which is to be used for controlling devices equipped in a vehicle, wherein the decrement means decreases the counter value associated with the specific sensing point twice or more until the counter value becomes less than the first threshold value, in a case where the specific sensing point of which the counter value is no less than the second threshold value is determined by the determination means as having no continuity to the recent sensing point.

(4) A radar device, comprising: the signal processing device according to any one of (1) to (3); a transmitter configured to output the transmission wave; and a receiver configured to receive the reflection wave.

(5) A vehicle control system, comprising: the radar device according to (4), which is configured to be equipped in a vehicle; and a vehicle controller configured to control devices equipped in the vehicle.

(6) A signal processing method configured to perform object detection processing for obtaining a peak signal indicative of a frequency difference between a transmitting signal of which a frequency is cyclically varying and a receiving signal obtained by receiving a reflection wave from an object which reflects a transmission wave based on the transmission signal, for each of a first period in which the frequency of the transmission signal is increasing and a second period in which the frequency is decreasing, and for pairing the peak signal obtained in the first period and the peak signal obtained in the second period, thereby detecting a sensing point indicative of a reflection point on the object associated with the peak signal, the signal processing method comprising: storing, in storage means, data indicative of a past sensing point which is the sensing point detected in the object detection processing performed in the past, and a counter value indicative of existence possibility of the past sensing point; determining whether the past sensing point has continuity to a recent sensing point which is the sensing point detected in the object detection processing performed lately; decreasing the counter value associated with the past sensing point determined by the determining as having no continuity to the recent sensing point; deleting, from the storage means, the data indicative of the past sensing point associated with the counter value when the counter value becomes less than a first threshold value; and identifying as a specific sensing point the sensing point possibly detected by pairing the peak signal obtained in the first period and the peak signal obtained in the second period in a wrong manner, wherein a first value is decreased from the counter value associated with the past sensing point, and a second value different from the first value is decreased from the counter value associated with the specific sensing point.

Advantageous Effects of Invention

According to the configuration of (1) to (6), the deletion timing of the past sensing point from the memory can be adjusted depending on whether the past sensing point is the past sensing point identified from the specific sensing point or the other past sensing point.

Further, according to the configuration of (2), the specific sensing point indicative of the sensing point possibly detected by pairing the peak signals in a wrong manner can be deleted from the storage means earlier than other past sensing points.

Further, according to the configuration of (3), in a case where object data associated with the specific sensing point is output, it becomes possible to determine whether the pairing of the specific sensing point is true or false by determining whether the combination of the peak signals is wrong twice of more without deleting the data of the specific sensing point from the storage device even if there is a possibility that the combination of the peak signals is mis-paired.

DETAILED DESCRIPTION OF THE INVENTION

Hereinafter, embodiments of the present invention will be described with reference to the accompanying drawings.

<1. Configuration>
<1-1. View of Whole Vehicle>

Figure 1:
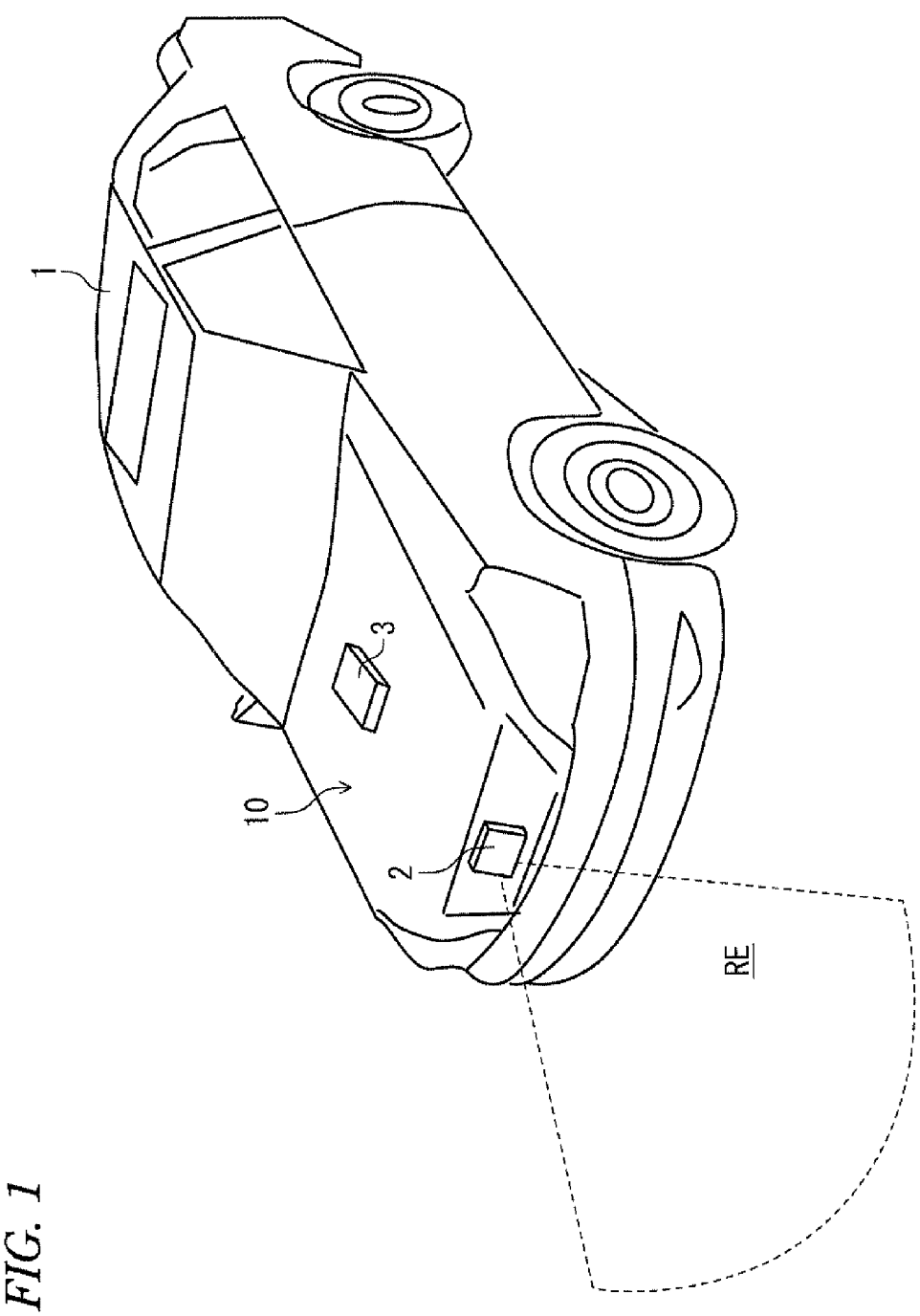
FIG. 1 is a perspective view schematically illustrating a vehicle as a whole.

As shown in FIG. 1, a vehicle 1 includes a radar device 2 that is a vehicle control system according to this embodiment and a vehicle control portion 3. The radar device 2 is provided in a front portion in front of the vehicle. The radar device 2 calculates a relative distance and a relative speed of the vehicle 1 against an object, and calculates an angle of the object as seen from the vehicle 1. On the other hand, the mount position of the radar device 2 is not limited to the front portion of the vehicle, but may be the rear portion or side portion of the vehicle 1.

The vehicle control unit 3 controls devices provided in the vehicle 1 based on object data output from the radar device 2. Examples of control performed by the vehicle control unit 3 may include brake control or accelerator control performed by controlling a device, such as a brake 40 or a throttle 41, in a case where the vehicle travels to follow a forward vehicle, warning indication performed by controlling an alarm device 42 in a case where danger of a collision exists, and brake control performed by controlling a brake 40. Further, examples of control may also include fixing of a passenger to a seat by means of a seat belt to cope with an impact when collision occurs, and control to fix a headrest to reduce damage of a passenger's body.

<1-2. System Block Diagram>

Figure 2:
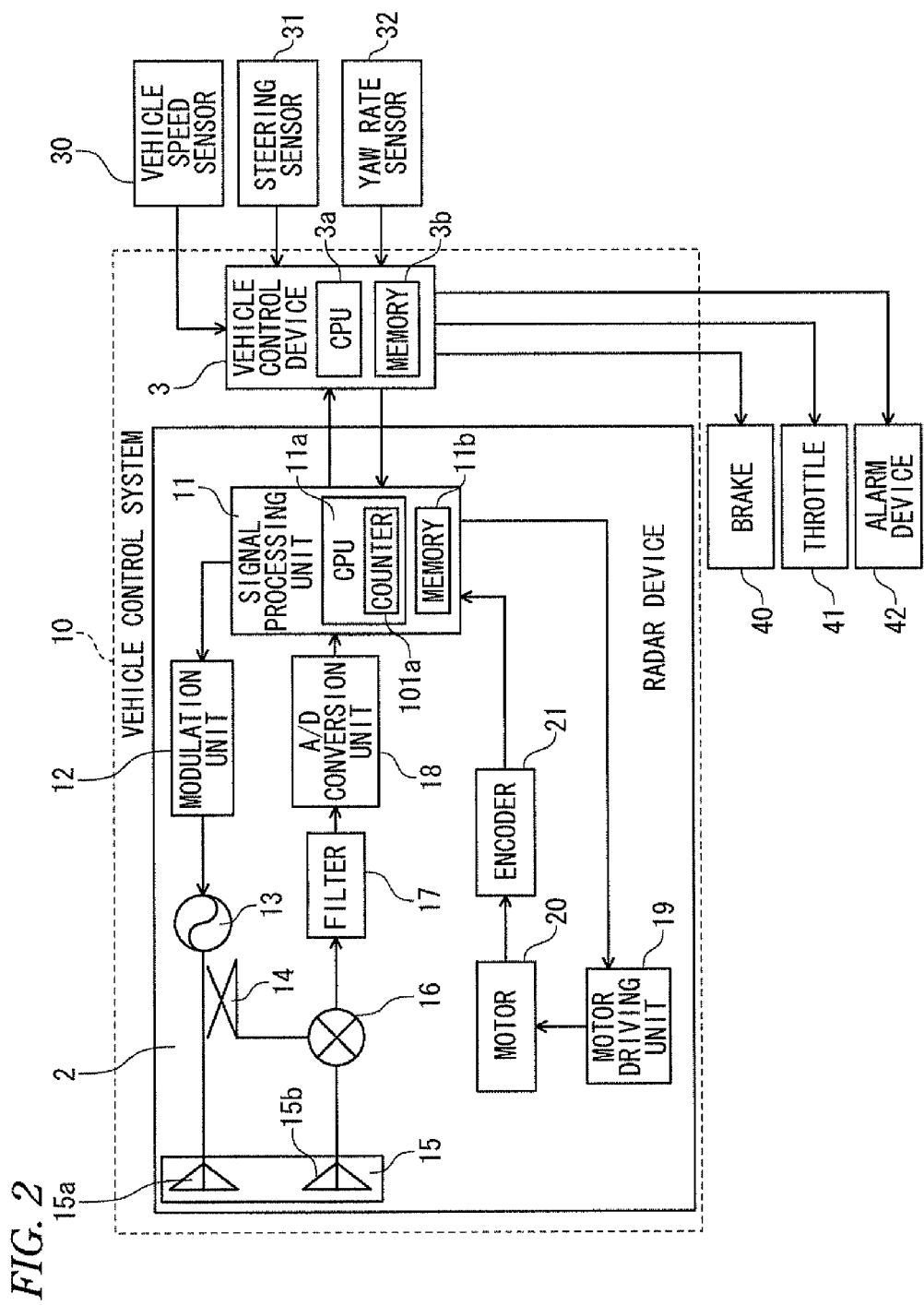
FIG. 2 is a block diagram illustrating a vehicle control system in FIG. 1.

FIG. 2 is a block diagram of a vehicle control system. The vehicle control system 10 is configured so that the radar device 2 and the vehicle control portion 3 are electrically connected to each other. Further, the vehicle control portion 3 of the vehicle control system 10 is electrically connected to various sensors provided in the vehicle 1, such as a vehicle speed sensor 30, a steering sensor 31, and a yaw rate sensor 32. Further, the vehicle control portion 3 is electrically connected to various sensors provided in the vehicle 1, such as the brake 40, the throttle 41, and the alarm device 42.

The radar device 2 includes a signal processing unit 11 (signal processing device according to the present invention), a modulation unit 12, a VCO (Voltage Controlled Oscillator) 13, a directional coupler 14, a planar antenna 15, a mixer 16, a filter 17, an A/D (Analog/Digital) conversion unit 18, a motor driving unit 19, a motor 20, and an encoder 21. On the other hand, the planar antenna 15 includes a transmission antenna 15a and a reception antenna 15b. In the embodiment to be described hereinafter, although an antenna scanning method of the radar antenna 2 is described as a mechanical scanning method to drive the antennas in a predetermined direction, the present invention can also be applied to an electronic scanning method that adopts a DBF (Digital Beam Forming) method or the like to estimate the direction of an object without driving the antennas.

The vehicle control by the radar device 2 is performed in a manner that the modulation unit 12 generates a modulation signal in a predetermined frequency band based on a signal from the signal processing unit 11. This modulation signal is converted into a transmission signal by the VCO 13, and is output from the transmission antenna 15a (transmission means according to the present invention) as a transmission wave through the directional coupler 14.

The transmission wave output from the planar antenna 15 is reflected from the object, and is received through the reception antenna 15b (reception means according to the present invention) as a reflection wave. The received reflection wave and an oscillation signal are mixed by the mixer 16 through the directional coupler 14.

The receiving signal mixed with the transmitting signal is a beat signal including information on the relative distance from the object or relative speed, filtered by the filter 17, and the beat signal in the band including the information on the relative distance from the vehicle 1 having the radar device 2 to the object or the relative speed.

The beat signal filtered to a predetermined frequency band by the filter 17 is converted from an analog signal to a digital signal by the A/D conversion unit 18, and then is input to the signal processing unit 11.

Further, the radar device 2 scans the planar antenna 15 in a predetermined angle range. In a state where the radar device 2 is provided on a bumper portion that is on the front portion of the vehicle 1 and a forward vehicle is located just in front of the vehicle 1, the angle of the planar antenna 15 becomes 0 when an antenna surface of the planar antenna 15 is in a vertical direction to the traveling direction of the vehicle 1. For example, the planar antenna 15 scans by 15 degrees in the left and right directions from the state of 0 degree. The scanning of this planar antenna 15 is performed using the motor driving unit 19 and the motor 20, and the encoder 21 that is accompanied with the scanning of the planar antenna 15 outputs information on the number of passages and the passage direction of a slit to the signal processing unit 11.

The signal processing unit 11 includes a CPU 11a that performs control of various portions of the radar device 2 and information processing when it performs data transmission/reception with the vehicle control unit 3, and a memory 11b in which a program that is used for the processing of the CPU 11a are stored. Various functions of the CPU 11a are realized by executing the program. Further, the signal processing unit 11 detects the relative distance or the relative speed of the object against the vehicle 1 based on the signal output from the A/D conversion unit 18 (object detection processing). Further, the signal processing unit 11 detects the angle of the object against the vehicle 1 by the information output from the encoder 21. A reflection point of the object that is detected by the radar device 2 based on the transmitting signal and the receiving signal is called s sensing point.

Further, the signal processing unit 11 performs continuity determination between the recent sensing point that is the sensing point detected in the recent object detection processing and the past sensing point (determination means according to the present invention). The signal processing unit 11 increases a counter value associated with the past sensing point of which the continuity to the recent sensing point is confirmed by this continuity determination (increment means according to the present invention). The recent sensing point that becomes equal to or larger than a data output threshold value (second threshold value according to the present invention) for outputting already prepared object data by the addition of the counter value is configured as a constituent element of the object data that is output from the signal processing unit 11 to the vehicle control unit 3.

Further, the signal processing unit 11 performs a process of decreasing the counter value associated with the past sensing point of which the continuity to the recent sensing point has not been confirmed (decrement means according to the present invention). The counter value indicates existence possibility of the sensing point as the value that is increased or decreased by the counter 101a to be described later. If the counter value becomes equal to or larger than a data output threshold value once or more, it is considered that object data configured by the sensing point exists, and the object data is output from the signal processing unit 11 to the vehicle control unit 3 (output means according to the present invention).

If the counter value obtained by performing the data output to the vehicle control unit 3 once or more becomes less than a data deletion threshold value (first threshold value according to the present invention) that is lower than the data output threshold value for outputting the object data, the signal processing unit 11 deletes the data of the corresponding past sensing point from the memory 11b (deletion means according to the present invention).

Further, the signal processing unit 11 identifies a specific sensing point that is a sensing point possibly detected by pairing a combination of peak signals in a wrong manner (identification means according to the present invention). The decreased counter value of the past sensing point of which the continuity to the recent sensing point has not been confirmed to be described later is set to differ between the sensing point (hereinafter referred to as a "normal sensing point") that is detected by pairing a combination of peak signals in a correct manner and the specific sensing point, and the respective decreased counter value may be changed. Through this, the deletion timing from the memory 11b can be controlled depending on whether the past sensing point is the specific sensing point or another past sensing point (normal sensing point).

Further, the past sensing point, which has not been equal to or larger than the data output threshold value even once (which is less than the data output threshold vale), among the past sensing points of which the continuity to the recent sensing point has not been confirmed, is deleted from the memory 11b in a case where the corresponding past sensing point is not detected in the latest object detection processing regardless of whether it is less than the data deletion threshold value. As described above, there is a high possibility that the past sensing point exists which has become equal to or larger than the data output threshold value even once, and if the past sensing point is not detected even through the object detection processing multiple times, it is deleted from the memory 11b. There is a low possibility that the past sensing point that is less than the data output threshold value exists, and if the past sensing point is not detected in the latest object detection processing, the data of the corresponding past sensing point is deleted from the memory 11b.

On the other hand, the sensing point has a relative distance, a relative speed, and an angle as parameter values, and the object data has parameters of the relative distance, the relative speed, and the angle of the configured sensing point.

The counter 101a is proved in the CPU 11a, and increases the counter value of the past sensing point of which the continuity to the recent sensing point, which is the sensing point detected in the latest object detection processing in the continuity determination processing by the signal processing unit 11, is confirmed.

Further, if the past sensing point is not detected as the recent sensing point in the next object detection processing, the counter value of the past sensing point is decreased. In this embodiment of the present invention, the counter 101a is configured to be provided inside the CPU 11a. However, the counter 101a may be provided in other position (for example, inside of the signal processing unit 11 or radar device 2).

In the memory 11b of the signal processing unit 11, data indicative of the past sensing point (information on the relative distance, the relative speed, and the angle (horizontal position) against the object that is configured using the information on the vehicle 1 and the sensing point) and the counter value for the past sensing point are stored (storage means according to the present invention). In the memory 11b, data of a plurality of sensing points and counter values for the respective sensing points are stored, and depending on the result of the continuity determination, the data of the sensing points and the counter values are updated.

The vehicle control unit 3 that is electrically connected to the signal processing unit 11 includes a CPU 3a and a memory 3b, and the CPU 3 performs control of respective portions of the vehicle and information processing when performing data communication and reception with the signal processing unit 11. Further, in the memory 3b, a program that is used for the processing of the CPU 3a and the object data transmitted from the signal processing unit 11 are stored. Various functions of the CPU 3a are realized by executing this program.

The vehicle control unit 3 is electrically connected to the brake 40, the throttle 41, and the alarm device 42, and controls them according to the object data to control the operation of the vehicle 1. For example, the alarm device 42 generates alarm when the distance between the vehicle 1 and the object becomes short. If there is a possibility that the vehicle 1 collides with the object, the brake 40 is operated to lower the speed of the vehicle 1 or throttle 41 is tightened to lower the revolution of an engine.

Further, the vehicle control unit 3 is connected to a vehicle speed sensor 30 that detects the speed of the vehicle 1, a steering sensor 31 that detects a steering angle of a steering wheel, and a yaw rate sensor 32 that detects a turning speed of the vehicle 1. On the other hand, by using both sides of the steering sensor 31 and the yaw rate sensor 32, it becomes possible to detect the turning direction of the vehicle 1 depending on the steering operation and the turning speed of the vehicle 1. Because of this, although it is preferable that both sensors are provided, it is possible to detect the turning direction of the vehicle 1 with only one of the steering sensor 31 and the yaw rate sensor 32.

Further, the transmission wave and the reception wave that are transmitted and received through the planar antenna 15 are signals of waves, laser, or ultrasonic waves. The signal is transmitted from the planar antenna 15, is reflected from the object, and is received as the reflection wave to detect the object data.

In this embodiment, the antenna is the planar antenna 15, but it may be any antenna that can receive the reflection wave from the object, such as a lens antenna or a reflecting mirror antenna, in addition to the planar antenna 15. Further, although it is described that the transmission antenna 15a and the reception antenna 15b have different configurations, one antenna for both transmission and reception that performs both the transmission and the reception may be used.

<2. Processing>
<2-1. FM-CW Signal Processing>

Then, as an example of signal processing used for object detection processing, a FM-CW (Frequency Modulated Continuous Wave) method will be described. In this embodiment, the FM-CW method is described as an example. However, the present invention is not limited to this method, and any method to calculate the object data through combination of a plurality of periods, such as an up period and a down period, may be used.

Figure 3:
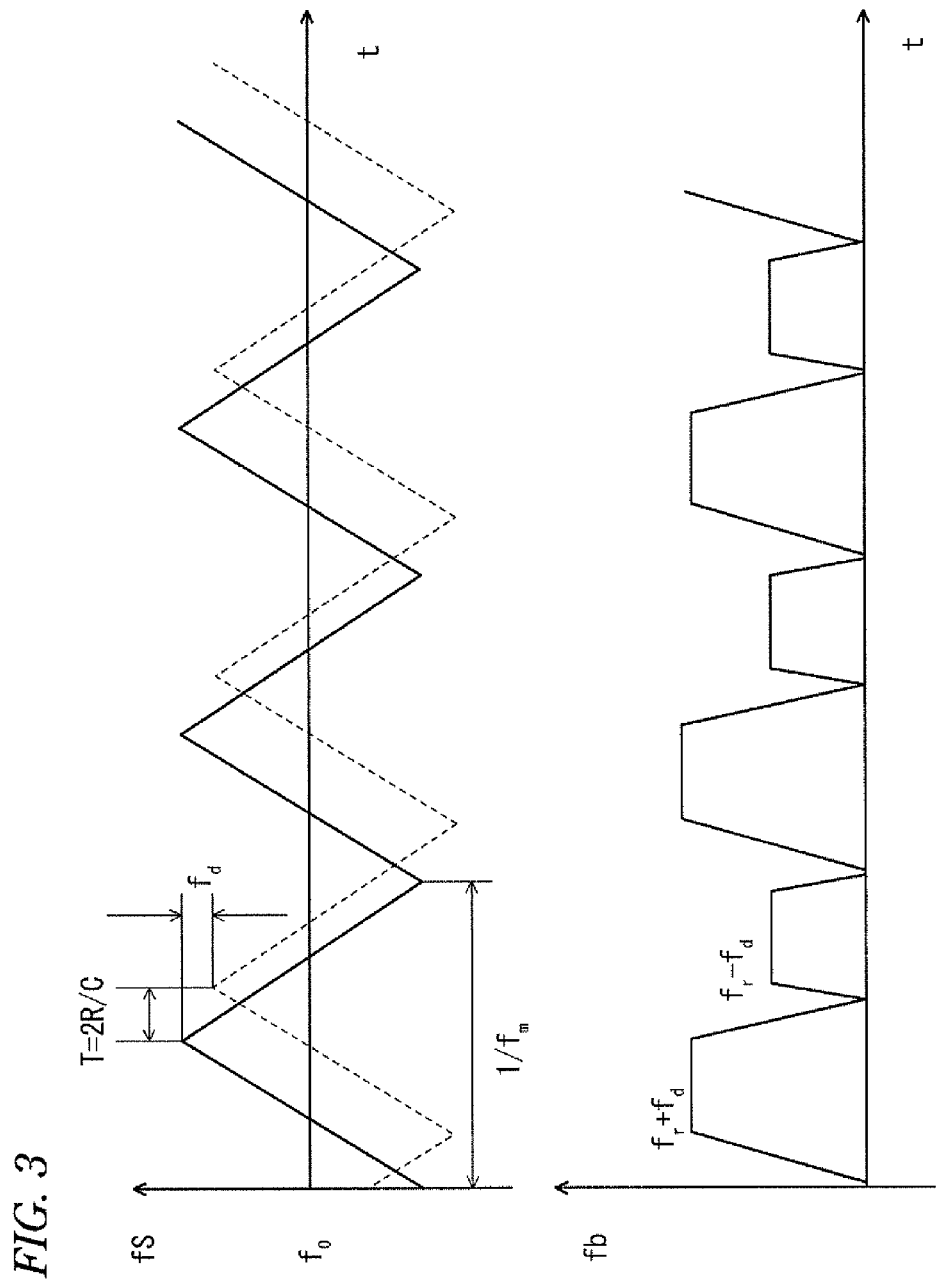
FIG. 3 is a diagram illustrating a FW-CW signal and a beat signal in object detection processing based on a FW-CW method.

Symbols that appear in equations described below and the FM-CW signal or the beat signal shown in FIG. 3 are as follows. Fb: beat frequency, fs: frequency, fr: distance frequency, fup: distance frequency in the up period, fdn: distance frequency in the down period, fd: speed frequency, f0: center frequency of a transmission wave, Δf: frequency deviation width, fm: repetition frequency of a modulation wave, C: speed of light (speed of a wave), T: reciprocating time of a wave to the object, R: distance to the object, V: relative speed to the object, and S: horizontal position An upper drawing in FIG. 3 shows a signal waveform of FM-CW transmitting signal and receiving signal. Further, a lower drawing in FIG. 3 shows a beat frequency that occurs by a difference frequency between the transmitting signal and the receiving signal. In the upper drawing in FIG. 3, the horizontal axis represents time, and the vertical axis represents frequency. In the drawing, the transmitting signal indicated by a solid line has a property where the frequency is changed in a predetermined period, and has an up period in which the frequency ascends up to a predetermined frequency and a down period in which the frequency descends to a predetermined frequency after it ascended to the predetermined frequency. The transmitting signal repeats a constant change so that it descends to the predetermined frequency and then ascends up to the predetermined frequency. Further, the transmitting signal is reflected by the object, and then is received as the receiving signal as shown as a dashed line in the drawing. In the same manner as the transmission signal, the reception signal also has an up period and a down period. In this embodiment, a used frequency band may be, for example, 76 GHz frequency band.

Further, the receiving signal has a time delay (T=2R/C) in comparison to the transmitting signal depending on the distance between the vehicle 1 and the object. Further, if there is a speed difference between the vehicle 1 and the object, the receiving signal is shifted in parallel to the axis of the frequency fs in comparison to the transmitting signal. This Doppler shift becomes fd.

In the lower drawing in FIG. 3, the beat frequency is calculated based on Expression 1 on the assumption that the horizontal axis represents time and the vertical axis represents beat frequency.

$$f_b = f_r \pm f_d = (4 \cdot \Delta f \cdot f_m / C) R + (2 \cdot f_0 / C) V \qquad \text{[Expression 1]}$$

On the other hand, a frequency spectrum is detected by performing FFT with respect to the beat signal indicated in Expression 1. The relative distance between the vehicle 1 and the object, the relative speed, and the angle are calculated by detecting the frequency spectrum that exceeds a predetermined threshold value among the detected frequency spectrums as a peak signal and performing the following process with respect to the peak signal.

<2-2. Object Detection Processing>

Figure 4:
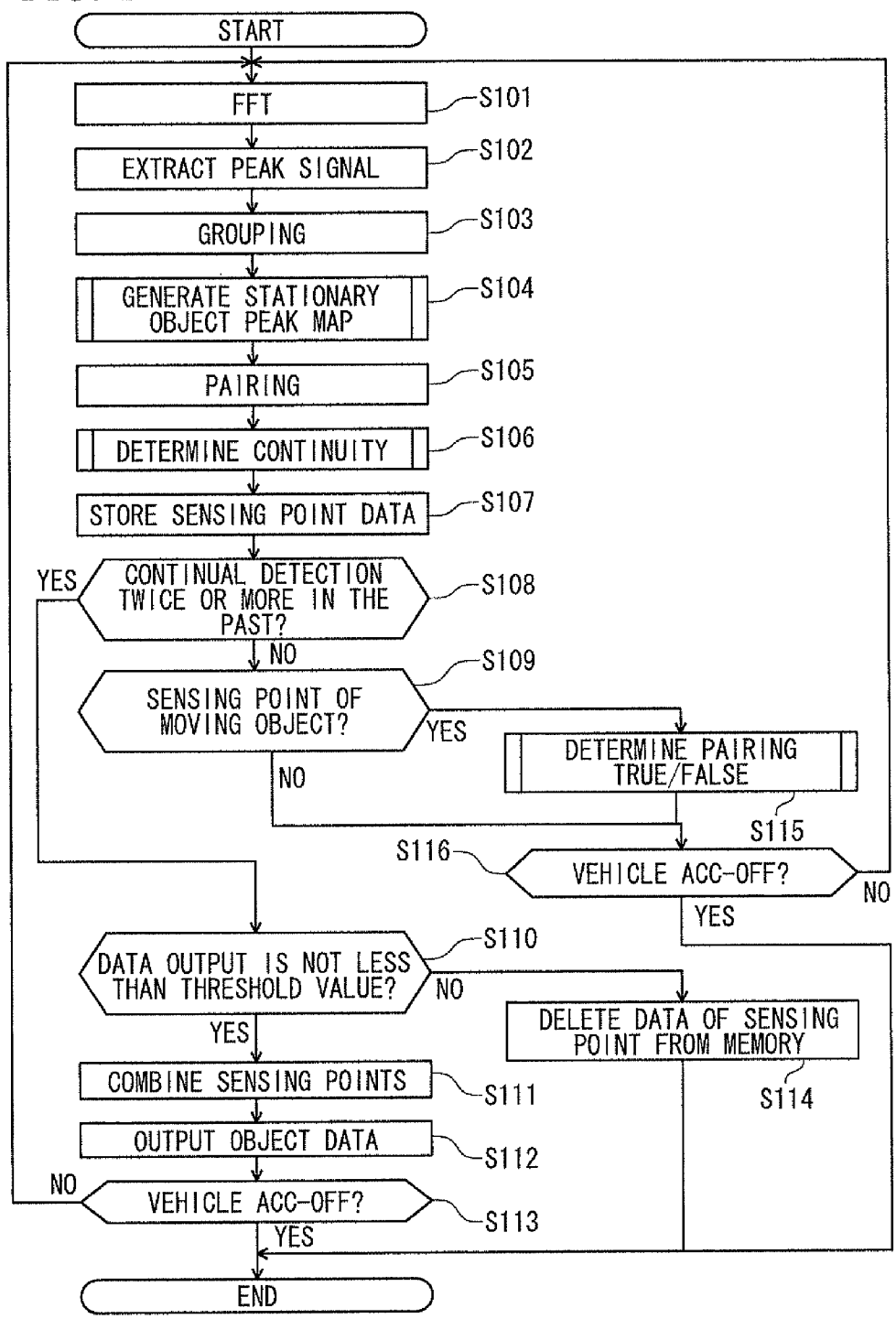
FIG. 4 is a flowchart illustrating the details of the object detection processing.

FIG. 4 shows the details of object detection processing. First, the beat signal that is generated by mixing the transmitting signal and the receiving signal with each other is A/D converted by the A/D conversion unit 18, is introduced to the signal processing unit 11, and then is FFT (Fast Fourier Transform)-transformed by the signal processing unit 11 (step S101).

The FFT-transformed beat signal is detected as the frequency spectrum. In general, since the frequency spectrum of the object has a relatively higher power level than the frequency spectrum of a noise or the like, the frequency spectrum that exceeds a threshold value that is set to a predetermined power level is extracted as a peak signal (step S102).

Then, a plurality of peak signals extracted by angles of the antenna are grouped as one group based on the information on the signal strength of the peak signal and the angle of the peak signal (step S103). AS a result, a plurality of groups including one or plural peak signals are generated in both the up period and the down period. Here, the grouping process is performed in a manner that the receiving signal received from a predetermined reflection range of the object is detected as the peak signal for each angle that forms the reflection range, and the one group that is formed by the peak signal for each angle is processed as a sensing point of one reflection point.

Then, a peak signal classification process is performed to classify positions of the peak signals that form the sensing points of stationary objects, which are targeted for pairing between the plurality of groups generated in the up period and the plurality of groups generated in the down period in the process of step S105, into any one of a plurality of areas in a map that corresponds to a peripheral area of the vehicle (step S104).

Here, the sensing point of the stationary object is a sensing point of the stationary object that appears as if the sensing point approaches the vehicle 1 at a speed of 40 km/h as seen from the vehicle 1 that approaches the target object at the speed of 40 km/h, and the sensing point that is not accompanied by the change of the position with the lapse of time.

On the other hand, stationary object peak map generation in step S104 will, be described in detail later using the drawings of FIGS. 5 to 8.

After the processing in step S104 of FIG. 4, the pairing process in step S105 is performed. This pairing process is a process to combine the peak signals of the plurality of groups generated in the up period and the plurality of groups generated in the down period based on the information on the speed of the vehicle 1, the signal strength of the grouped peak signal, and the angle of the grouped signal (step S105). Through this pairing process, the sensing point having parameters of the relative distance from the object, the relative speed, and the angle is detected.

Then, a continuity determination process is performed to derive whether the recent sensing point that is a sensing point detected in the latest object detection process is a sensing point that is continuous to the past sensing point detected in the past object detection process and whether the sensing point is continually detected (step S106). On the other hand, the continuity determination process in this step S106 will be described in detail using FIGS. 9 and 10.

Depending on whether the sensing point is continually detected as the result of the continuity determination, the counter value obtained by increasing or decreasing the value is stored in the memory 11b together with the corresponding sensing point data (step S107). In a case where the target sensing point is continually detected three times or more (in a case of continuity twice or more) ("Yes" in step S108), the processing proceeds to step S110, and it is derived whether the counter value of the target sensing point is equal to or larger than the data output threshold value (step S110).

Returning to step S108, in a case where the sensing point is a new sensing point firstly detected (in a case of the continuity of 0 times), or in a case where the sensing point was firstly detected at the previous time and then is also detected this time (in a case of continuity once) ("No" in step S108), it is derived whether the sensing point is the sensing point of a moving object (step S109).

Whether the sensing point is a sensing point of a moving object can be determined by the relative speed of the detected sensing point to the vehicle 1. In a case where the sensing point is not the sensing point of the moving object (in a case of the sensing point of the stationary object) ("No" in step S109), it is derived whether an ACC of the vehicle 1 is in an OFF state (step S116), and if the ACC of the vehicle 1 is in the OFF state ("Yes" in step S116), the processing returns to the processing in step S101 and the detection of the sensing point by the scanning is performed.

Then, the processing returns to the step S109, and if the sensing point is the sensing point of the moving object ("Yes" in step S109), a pairing true/false determination process (step S115) is performed.

In the pairing true/false determination process in step S115, the sensing point of the moving object is targeted for determination as described above. Here, the sensing point of the moving object is a sensing point of the moving object that appears as if the sensing point approaches the vehicle 1 at a speed of 70 km/h (in this case, the object is traveling toward the direction of the vehicle 1 at a speed of 30 km/h) in a case where the vehicle 1 approaches the target object at a speed of 40 km/h, and the sensing point of which the position is changed with the lapse of time.

The sensing point of the moving object is divided into the sensing point of an oncoming vehicle that is coming toward the direction of the vehicle 1 and the sensing point of a forward vehicle that is traveling in the same direction as the traveling direction of the vehicle 1. From the viewpoint to prevent a wrong control in a case where the vehicle 1 is detected as the sensing point of the moving object, explanation will be made with respect to the sensing point of the oncoming vehicle that is coming toward the direction of the vehicle 1. However, the present invention is not limited to the sensing point of the oncoming vehicle, but is applicable to the sensing point of the forward vehicle.

In the pairing true/false determination in step S115 as described above, in a case where the position of the sensing point of the moving object is in an area where the number of peak signals that form the classified stationary object data is equal to or larger than the predetermined threshold value among the plurality of areas of a map in which peak signals are classified in step S104, the sensing point of the moving object is derived as a specific sensing point that is a sensing point possibly detected by pairing of a combination of the peak signals in a wrong manner. This determination will be described in detail using FIGS. 11 and 12 later.

After the processing in step S115, it is derived whether the vehicle 1 is in an ACC-OFF state (step S116). If the vehicle 1 is in the ACC-OFF state ("Yes" in step S116), the processing is terminated. Further, if the vehicle 1 is not in the ACC-OFF state ("No" in step S116), the processing returns to the processing in step S101, and the detection of the sensing point by the scanning is performed.

Returning to step S110, if the counter value of the recent sensing point is equal to or larger than the data output threshold value, a sensing point combination process is then performed (step S111). This sensing point combination process is a process in which one or plural sensing points, each of which is one reflection point of one object data, are combined to provide one object data. Specifically, the sensing point combination process is a process in which sensing points, which are based on one or plural reflection points from one object of a moving object, such as a car, a truck, and a motorcycle, and a stationary object, such as a guard rail and a railway bridge, are combined as one object data.

The object data is output to the vehicle control unit 3 (step S112). Based on the output object data, the vehicle control unit 3 controls the vehicle 1, such as operation of the brake 40, operation of the throttle 41, and operation of the alarm device 42, using the vehicle control unit.

If the vehicle is in an ACC-OFF state ("Yes" in step S113), the processing is terminated, and if the vehicle is in an ACC-ON state ("No" in step S113), the processing returns to step S101 and a new object detection process is repeatedly performed.

Returning to step S110, if the counter value of the past sensing point is not equal to or larger than the data output threshold value ("No" in step S110), the data of the past sensing point of which the counter value is less than the data output threshold value is deleted from the memory 11b (step S114), and the processing is terminated.

<2-3. Stationary Object Peak Map Generation Processing>

Then, a stationary object peak map generation processing in step S104 of FIG. 4 will be described in detail using FIGS. 5 to 8. First, a concrete example of the sensing point detection with respect to the detected object will be described.

Figure 6:
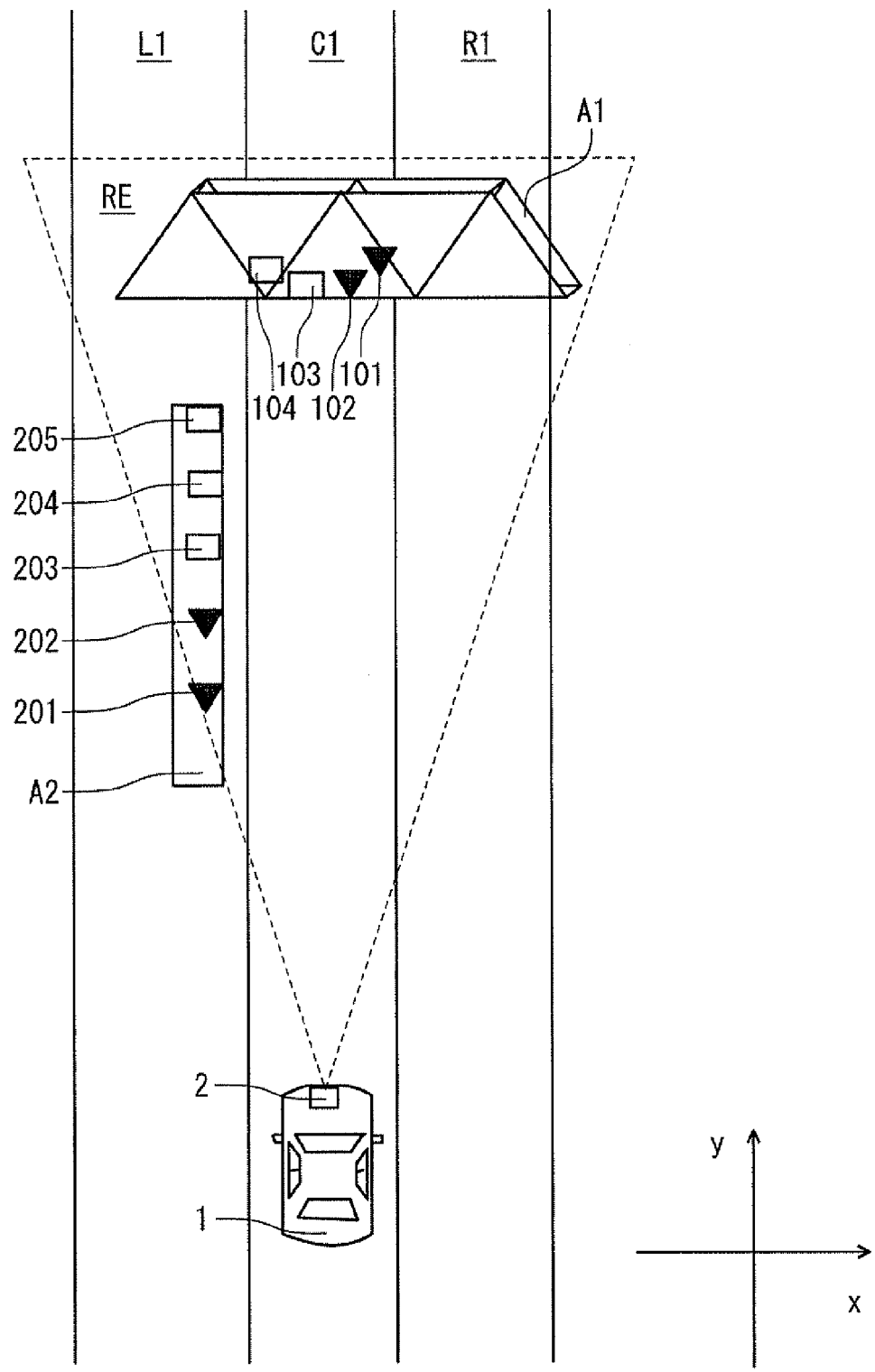
FIG. 6 is a diagram illustrating a concrete example of sensing point detection in the object detection processing.

In FIG. 6 and the subsequent figures, xy coordinate axes are relatively fixed with respect to the vehicle 1, and the horizontal direction (left/right direction) of the vehicle 1 corresponds to an x-axis direction and the vertical direction (traveling direction) corresponds to a y-axis direction.

FIG. 6 shows that a stationary object A1 (railway bridge) and a stationary object A2 (guard rail) are detected in a scanning range RE of the radar device 2 provided on the vehicle 1 that travels in the +y direction on a road C1. The radar device 2 detects a plurality of sensing points, that is, sensing point 101, sensing point 102, sensing point 103, and sensing point 104, with respect to the stationary object A1 located in the traveling direction (+y direction) of the vehicle on the road C1 Further, the radar device 2 detects the stationary object A2 in the left direction (−x direction) of the vehicle on a road L1, and with respect to this stationary object A2, a plurality of sensing points, that is, sensing point 201, sensing point 202, sensing point 203, sensing point 204, and sensing point 205, are detected.

As described above, although the sensing point 101 and the sensing point 102 are originally the sensing points of the stationary object A1, they are detected as the sensing points of a moving object (the sensing point of an oncoming vehicle that is traveling toward the direction of the vehicle 1, and hereinafter referred to as the "sensing point of an oncoming vehicle") due to a wrong pairing. The remaining sensing points of the stationary object A1, that is, sensing point 103 and sensing point 104, are detected as the sensing points of the stationary object.

Further, although the sensing point 201 and the sensing point 202 are the sensing points of the stationary object A2, they are detected as the sensing points of the oncoming vehicle due to the wring pairing. The remaining sensing points of the stationary object A2, that is, sensing point 203, sensing point 204, and sensing point 205, are detected as the sensing points of the stationary object. Such wrong pairing may easily occur in a case where a plurality of groups of peak signals exist in adjacent positions.

Figure 5:
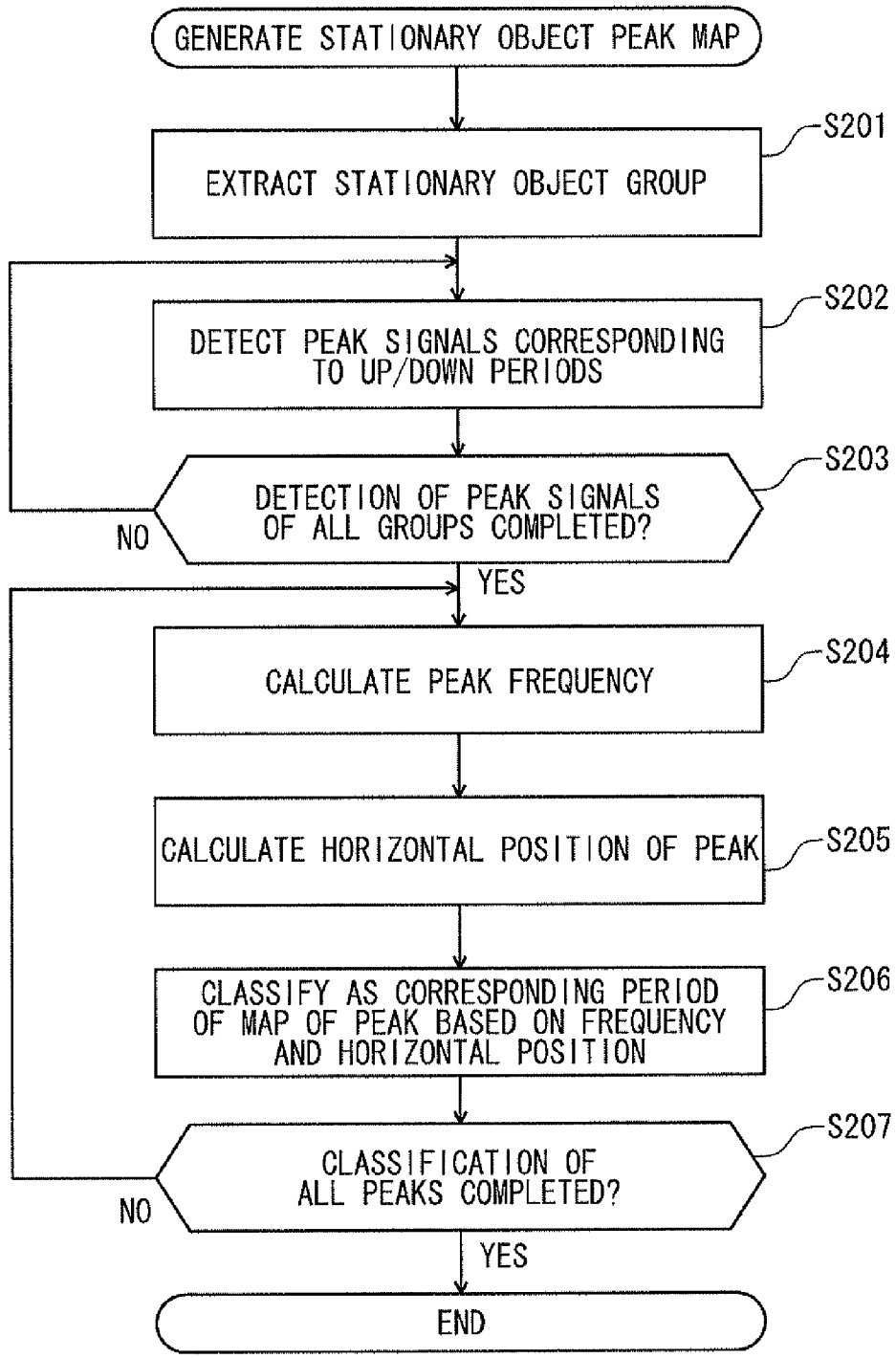
FIG. 5 is a flowchart illustrating the details of a stationary object peak map generation processing in FIG. 4.
Figure 7:
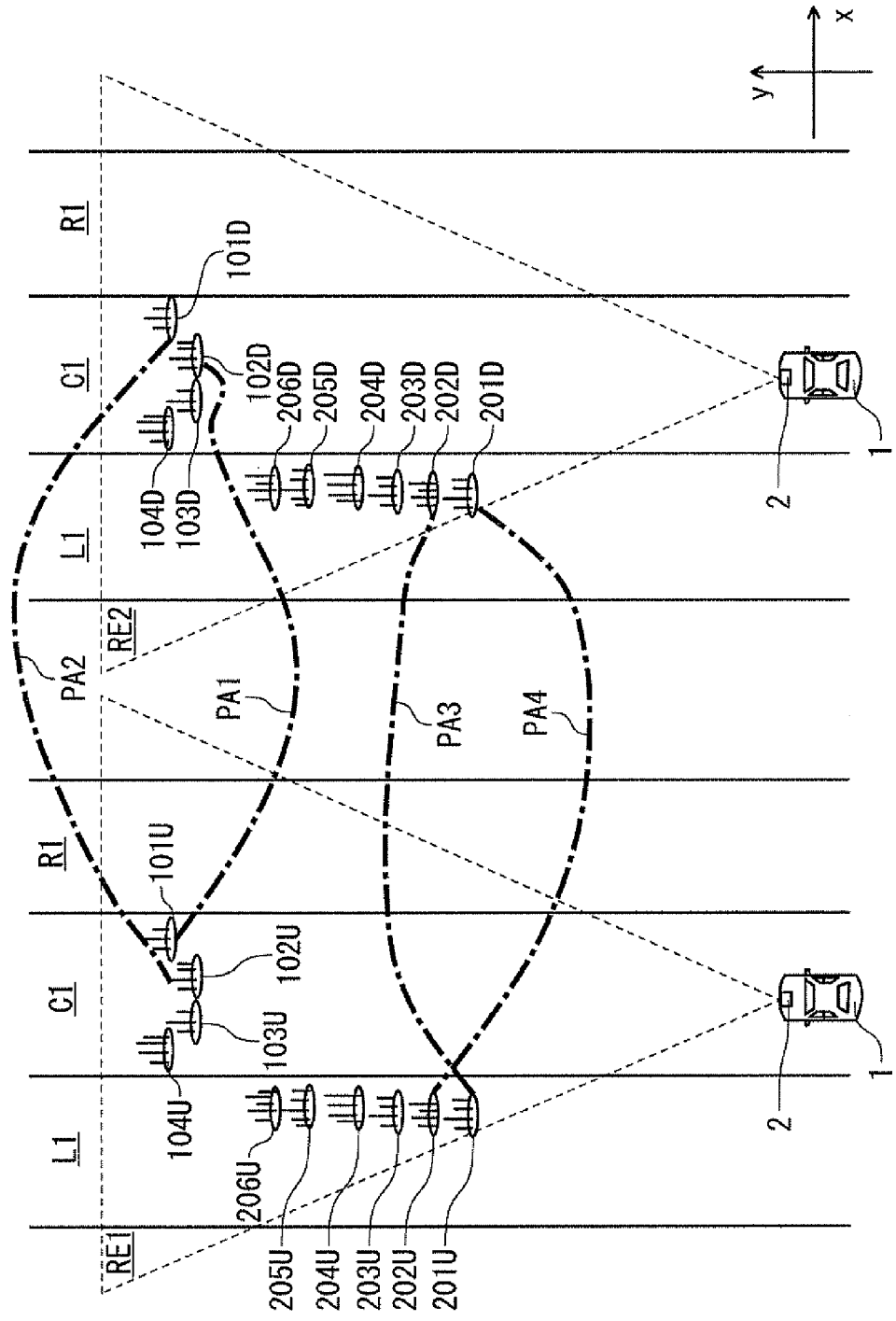
FIG. 7 is a diagram illustrating the details of a peak signal detection processing in FIG. 5.

In the stationary object peak map generation process shown in FIG. 5, stationary object groups are first extracted (step S201), and peak signals that correspond to the up period and the down period are detected (step S202). The processing in the steps S201 and S202 will also be described using FIG. 7. FIG. 7 is a diagram illustrating peak signal groups in the up period and the down period. The scanning range RE1 indicates the peak signal group detected in the up period, and the scanning range RE2 indicates the peak signal group detected in the down period. Although the sensing point 101 that represents the stationary object A1 should be detected as the sensing points of the stationary object through pairing of a peak group 101U and a peak group 101D from the information on the signal strength and the angle of the peak signal, a plurality of peak groups (hereinafter simply referred to as "groups") exist in adjacent positions, and thus the group 101U and the group 102D are paired (PA1) in a wrong manner, and once pairing is performed, they become the sensing points of the oncoming vehicle.

Further, in the same manner as the sensing point 101, although the sensing point 102 should be detected as the sensing points of the stationary object through pairing of a group 102U and a group 102D from the information on the signal strength and the angle of the peak signal, the group 102U and the group 101D are paired (PA2), and once pairing is performed, they become the sensing points of the oncoming vehicle.

On the other hand, a group 103U and a group 103D, and a group 104U and a group 104D are properly paired, respectively, and once pairing is performed, they become the sensing points of the stationary object.

Although the sensing point 201 that represents the stationary object A2 should be detected as the sensing points of the stationary object through pairing of a peak group 201U and a peak group 201D from the information on the signal strength and the angle of the peak signal, a plurality of groups exist in adjacent positions, and thus the group 201U and the group 202D are paired (PA3) in a wrong manner, and once pairing is performed, they become the sensing points of the oncoming vehicle.

Further, although the sensing point 202 should be detected as the sensing points of the stationary object through pairing of a peak group 202U and a peak group 202D from the information on the signal strength and the angle of the peak signal, a plurality of groups exist in adjacent positions, and thus the group 202U and the group 201D are paired (PA4) in a wrong manner, and once pairing is performed, they become the sensing points of the oncoming vehicle.

On the other hand, a group 203U and a group 203D, a group 204U and a group 204D, and a group 205U and a group 205D are properly paired, respectively, and once pairing is performed, they become the sensing points of the stationary object.

Accordingly, in the stationary object group extraction process of step S201 in FIG. 5, groups 103U, 104U, 203U, 204U, and 205U are extracted from the groups in the up period, and groups 103D, 104D, 203D, 204D, and 205D are extracted from the groups in the down period.

Figure 8:
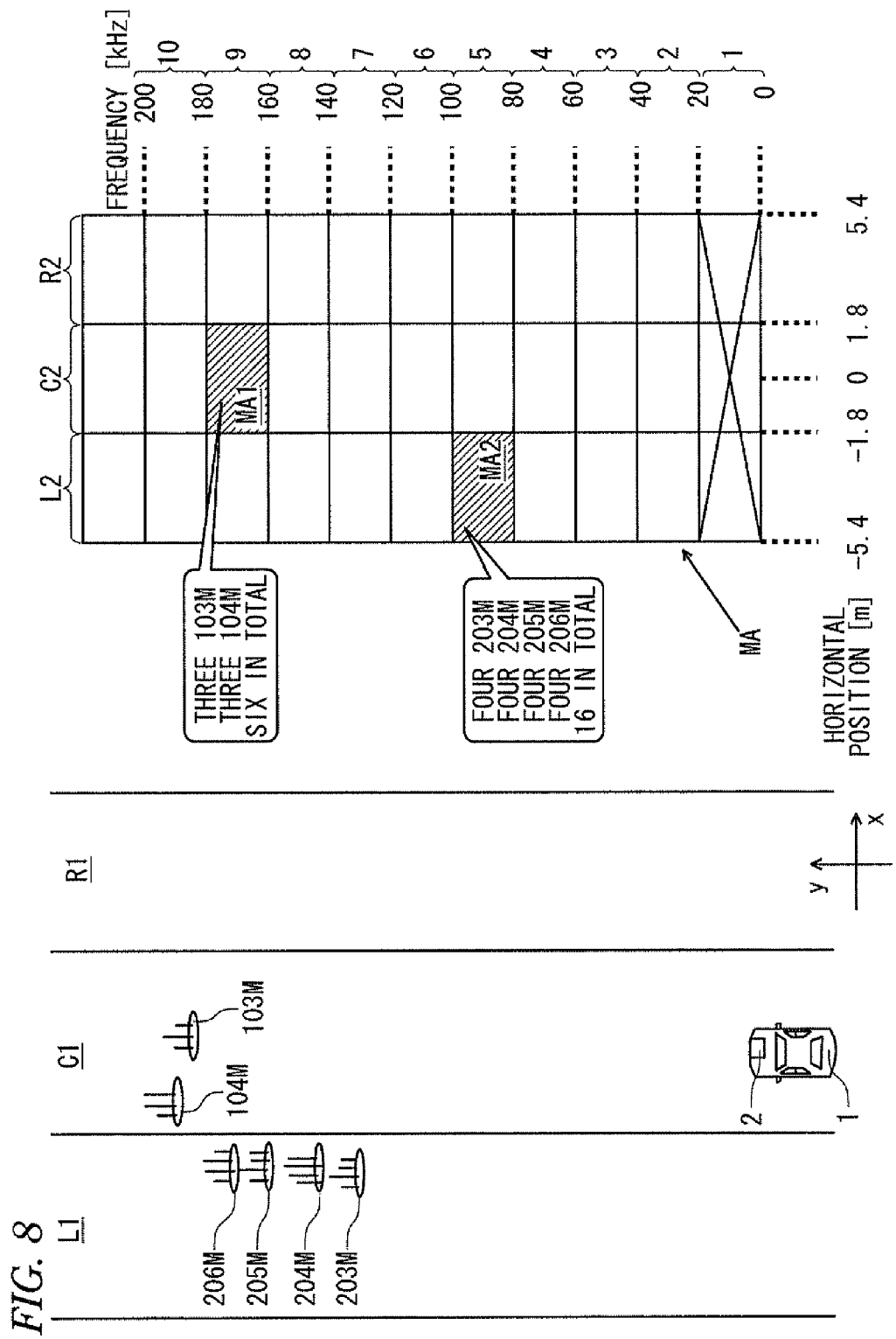
FIG. 8 is a diagram illustrating a process of classifying peak signals that form sensing points of stationary objects on a map in FIG. 5.

Then, peak signals corresponding to the groups in the up period and the down period are detected. The processing in step S202 and the subsequent steps will also be described using FIG. 8. FIG. 8 is a diagram illustrating peak signals that represent the sensing points of the stationary object applied onto a map MA. The peak signals of the respective groups of group 103M, group 104M, group 203M, group 205M, and group 206M illustrated in FIG. 8 are detected from data of a group 103U and a group 103D, a group 104U and a group 104D, a group 203U and a group 203D, a group 204U and a group 204D, and a group 205U and a group 205D, which represent the sensing points of the stationary object detected in the process of FIG. 7.

For example, a group 103M is a group extracted based on the group 103U and the group 103D. The group 103M is configured by extracting only the peak signals, in which the peak signals that correspond to the up period and the down period exist, from the information on the peak signal strengths and the angles of the peak signals representing the group 103U and the peak signals representing group 103D. That is, since three peak signals are present in the group 103U and three peak signals are present in the group 103D, the group 103M becomes a group having three peak signals as the result of extracting the corresponding peak signals based on the information on the signal strengths and the angles of the respective peak signals.

Further, a group 104M of another group is a group extracted based on the group 104U and the group 104D. The group 104M is configured by extracting only the peak signals, in which the peak signals that correspond to the up period and the down period exist, from the information on the peak signal strengths and the angles of the peak signals representing the group 104U and the peak signals representing group 104D. That is, although three peak signals are present in the group 104U and four peak signals are present in the group 104D, the group 104M becomes a group having three peak signals as the result of extracting the corresponding peak signals based on the information on the signal strengths and the angles of the respective peak signals. As described above, the peak signals that correspond to the groups in the up period and the down period representing the sensing points of the stationary object are detected. As a result, a group 203M that is another group has 4 signals, a group 204M has 4 signals, a group 205M has 4 signals, and a group 206M has 4 signals.

Referring again to the flowchart of FIG. 5, the explanation of the stationary object peak map generation process will be continued. After the processing in step S202, it is determined whether the detection of the peak signals of all groups is completed (step S203). If the detection of the peak signals of all groups is completed ("Yes" in step S203), the processing proceed to step S204, and if the detection of the peak signals of all groups is not completed ("No" in step S203), the processing in step S202 is repeatedly performed. In this embodiment, it is determined whether the detection of the peak signals of all groups of the data of the group 103U and the group 103D, the group 104U and the group 104D, the group 203U and the group 203D, the group 204U and the group 204D, and the group 205U and the group 205D is completed, and the respective processes are performed.

Then, in the processing in FIG. 5, to correspond to a map MA to be described hereinafter, the frequency of the peak signal is calculated using Expression 2 (step S204).

$$f_{up}=R(4\cdot\Delta f\cdot f_m/C)+V(2\cdot f_O/C) \quad \text{[Expression 2]}$$

Further, using Expression 3 and Expression 4, the horizontal position of the peak signal is calculated (step S205). The horizontal position corresponds to the distance in left and right directions of the vehicle. The horizontal position will be described in detail hereinafter.

$$R=(f_{up}+f_{dn})/(8\cdot\Delta f\cdot f_m/C) \quad \text{[Expression 3]}$$

$$S=R\times\theta\times\pi/180 \quad \text{[Expression 4]}$$

The peak signals are classified in the corresponding periods of a map MA based on the information on the calculated frequency and the horizontal position (step S206). Then, it is determined whether the classification to the map MA of all the peak signals has been accomplished (step S207). If the classification to the map MA of all the peak signals is completed ("Yes" in step S207), the processing is terminated. On the other hand, if the classification to the map of all the peak signals is not completed ("No" in step S207), the processing returns to step S204, and the classification process to the map of the peak signals is repeatedly performed.

The classification process to the map MA of the peak signals will be described in detail using FIG. 8. The map MA shown in FIG. 8 corresponds to a peripheral area of the vehicle 1, and is classified into a plurality of areas. This map MA includes two directions of a vertical axis and a horizontal axis, and the vertical axis (y-axis direction) of the map MA represents frequency. 0 kHz is set in the neighborhood of the position where the radar device 2 of the vehicle 1 is provided, the frequency is increased toward the traveling direction (+y direction) of the vehicle 1, and is divided at intervals of 20 kHz. On the other hand, the frequency corresponds to the distance in the vertical direction (y-axis direction).

Further, it is prescribed that the horizontal axis (x-axis direction) of the map MA represents the distance in the horizontal direction, the position of the vehicle 1 becomes an original point, and the position of a sensing point based on the position of the vehicle 1 in the left/right direction (x-axis direction) is the horizontal direction. The map MA is classified into a plurality of areas through such horizontal and vertical divisions, and thus the true/false of the pairing processing of the sensing points that represents the data of the moving object by areas can be confirmed.

Further, the peak signals constituting the sensing points of the stationary object detected in step S203 of FIG. 5 is classified in the corresponding divisions of the map MA depending on the frequency and the horizontal position. In the respective peak signals of the group 103 and the group 104 located on the same road C1 as the vehicle 1, from the frequency and the horizontal position, the vertical axis of the map MA corresponds to section 9 (160 kHz to 180 kHz) of the frequency and the horizontal axis corresponds to section C2 (−1.8 m to +1.8 m) having the position and the width corresponding to the road C1 of the vehicle 1. Accordingly, the peak signals of the group 103 and the group 104 correspond to the area MA1 of the map MA, and the total of the number of peak signals of this area becomes 6.

Further, In the respective peak signals of the group 203, the group 204, the group 205, and the group 206 located on a road L1 in the left direction (−x direction) of the vehicle 1, from the frequency and the horizontal position, the vertical axis of the map MA corresponds to section 5 (80 kHz to 100 kHz) of the frequency and the horizontal axis corresponds to section L2 (−1.8 m to −5.4 m) having the position and the width corresponding to the road L1 of the vehicle 1. Accordingly, the peak signals of the group 203, the group 204, the group 205, and the group 206 correspond to the area MA2 of the map MA, and the total of the number of peak signals of this area becomes 16. The data of the map MA of the peak signals classified as above is stored in the memory 11b of the signal processing unit 11.

<2-4. Continuity Determination Processing>

Figure 9:
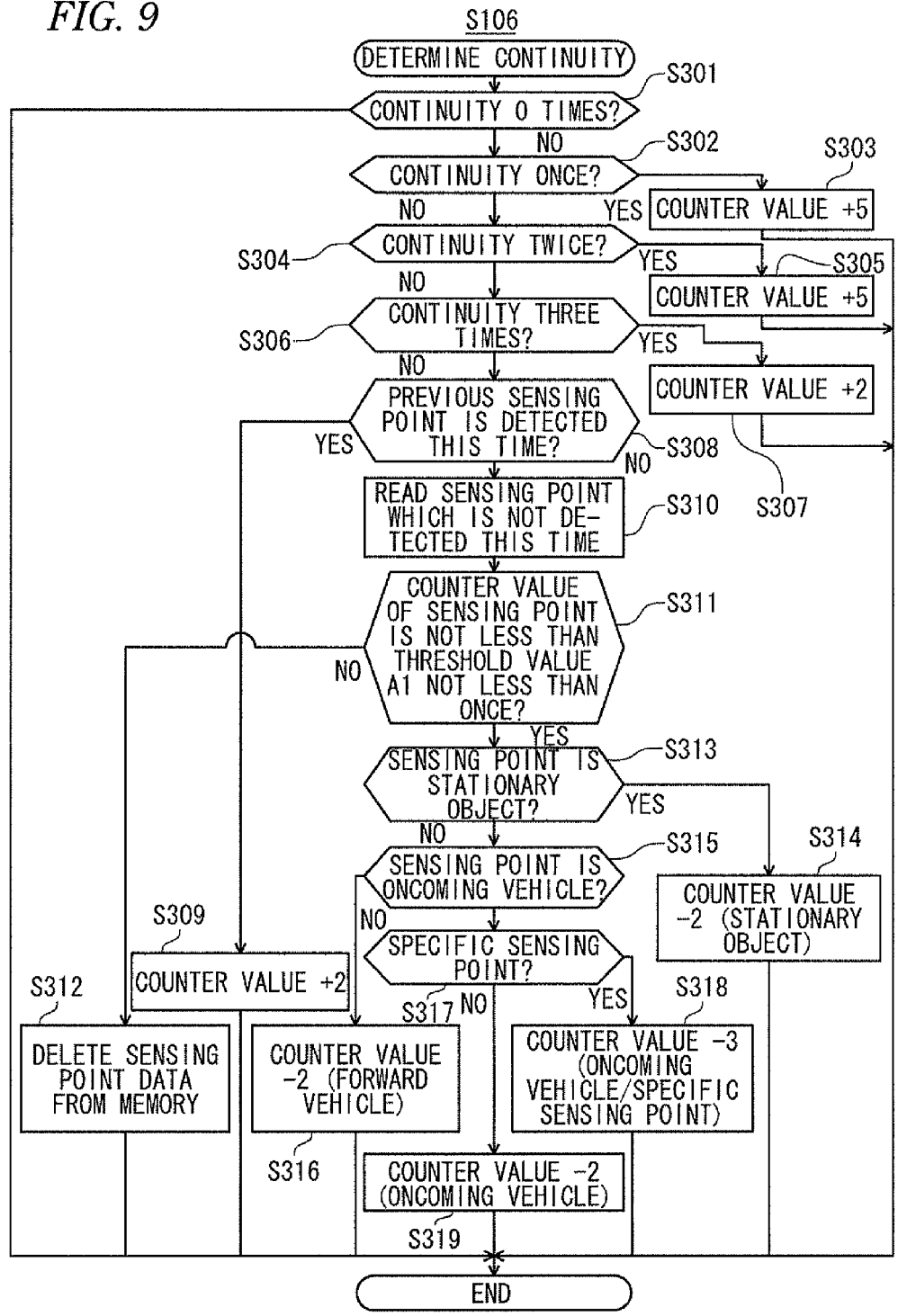
FIG. 9 is a flowchart illustrating the details of continuity determination processing in FIG. 4.

Then, the continuity determination processing in step S106 as shown in FIG. 4 will be described in detail using FIG. 9. In this process, the continuity between the recent sensing point detected by the latest object detection processing and the past sensing point detected in the past is determined, and the counter value is increased with respect to the sensing point having the continuity, and the counter value is decreased with respect to the sensing point having no continuity.

If the continuity between the recent sensing point detected through the object detection processing and the past sensing point is 0 times, that is, if the sensing point is the sensing point that is firstly detected in the latest object detection process, the processing is terminated, and the increment/decrement of the counter value with respect to the past sensing point by the counter 101a is not performed. On the other hand, after the processing of FIG. 9 is terminated, the data of the sensing point and the counter value (in this case, counter value 0) are stored in the memory 11b in the processing in step S107 as shown in FIG. 4. Hereinafter, even in the respective processes in FIG. 9, the data of the sensing point and the counter value are stored in the memory 11b with the increase/decrease of the counter value.

Referring again to FIG. 9, explanation of the continuity determination process will be continued. If the continuity of the sensing point is not 0 ("No" in step S301), and if the continuity between the recent sensing point and the past sensing point is once ("Yes" in step S302), the value of 5 is added to the counter value of the past sensing point by the counter 101a (step S303), and the processing is terminated.

If the continuity of the detection of the sensing point is not once ("No" in step S302), it is derived whether the continuity between the recent sensing point and the past sensing point is twice (step S304), and if the continuity of the detection of the sensing point is twice ("Yes" in step S304), the value of 5 is added to the counter value of the sensing point by the counter 101a (step S305), and the processing is terminated.

On the other hand, as described later using FIG. 10, it is assumed that the position of the counter value is the data output threshold value A1 (hereinafter also referred to as "threshold value A1"), and if the counter value of the recent sensing point, to which the counter value of the past sensing point is added, is equal to or larger than 10 that is the threshold value A1, the signal processing unit 11 outputs the object data constituted by the sensing point of the counter value that is equal to or larger than the threshold value A1 to the vehicle control unit 3.

If the continuity of the detection between the recent sensing point and the past sensing point is not twice ("No" in step S304), it is derived whether the continuity of the detection of the sensing point is three times (step S306), and if the continuity is three time ("Yes" in step S306), the value of 2 is added to the counter value of the past sensing point by the counter 101a (step S307), and the processing is terminated.

If the continuity of the detection of the sensing point is three times ("No" in step S306), it is derived whether the sensing point detected last time is now detected by this scanning (step S308). If the sensing point detected last time is detected by this scanning ("Yes" in step S308), the value of 2 is added to the counter value of the past sensing point (step S309), On the other hand, with respect to the resultant value obtained by adding the counter value to the past sensing point, a predetermined upper threshold value is prepared, and for example, if the counter value exceeds 14, the counter value is not increased any more.

If the sensing point detected by the last scanning is not detected by this scanning ("No" in step S308), that is, if the recent sending point having continuity to the past sensing point, the past sensing point, of which the continuity has not been conformed, is read from the memory 11b (step S310), and the counter value is decreased depending on the kind of the sensing point, such as whether the sensing point is for the stationary object or the moving object.

In a case where the counter value of the sensing point of which the continuity has not been confirmed is the past sensing point that has become equal to or larger than the threshold value A1 once or more (the past sensing point where the counter value has become equal to or larger than 10 in even once) ("Yes" in step S311), the extrapolation is performed.

Here, according to the extrapolation processing, if the continuity of the past sensing point, of which the counter value became equal to or larger than the threshold value A1 once or more, is not confirmed, the sensing point exists in the predetermined position. In this case, the data of the past sensing point is updated, the counter value is decreased, and the data of the updated sensing point (recent sensing point) and the decreased counter value are stored in the memory 11b.

According to the extrapolation processing in the past sensing point where the counter value became equal to or larger than the threshold value A1 once or more, the data of the target past sensing point is not immediately deleted from the memory 11b by the counter value decreased in a case where the number of processing is once, and if the counter value of the past sensing point becomes less than the data deletion threshold value B1 (hereinafter referred to as a "threshold value B1") that is lower than the threshold value A1 by the decrement of the counter value with the extrapolation processing multiple times, the data of the target past sensing point is deleted from the memory 11b. Through this, even in a case where the continuity to the past sensing point having high existence possibility is not confirmed, the existence possibility can be determined while the object detection processing is performed multiple times without immediately deleting the data of the past sensing point from the memory 11b.

Referring again to FIG. 9, explanation of the continuity determination process will be continued. If the sensing point is not the sensing point where the counter value has become equal to or larger than the threshold value A1 once or more ("No" in step S311), the target past data is deleted from the memory 11b (step S312), and the processing is terminated. Through this, the past sensing point having low existence possibility is deleted early from the memory 11b, and another past sensing point having high existence possibility is preferentially stored.

Then, as the subsequent process in a case of "Yes" in step S311, a process of decreasing the counter value depending on the kind of each sensing point is performed. If the sensing point read from the memory 11b is the sensing point of the stationary object ("Yes" in step S313), the counter value of the target past sensing point is decreased by 2 (step S314), and the processing is terminated.

If the sensing point is not the stationary object ("No" in step S313), it is determined whether the sensing point is an oncoming vehicle (step S315). Whether the sensing point is the oncoming vehicle is determined by determining whether the sensing point approaches the vehicle 1 in compared with the data of the past sensing point. If the sensing point is a specific sensing point possibly mis-paired ("Yes" in step S317) in a state where the sensing point is the oncoming vehicle ("Yes" in step S315), the counter value, of which the decrement value is larger than the decrement value of a normal sensing point normally paired, is decreased by 3 (step S318), and the processing is terminated.

On the other hand, if the sensing point of the oncoming vehicle is a normal sensing point rather than the specific sensing point ("No" in step S317), the counter value, of which the decrement value is smaller than that of the specific sensing point, is decreased by 2 (step S319), and the processing is terminated.

On the other hand, if the sensing point is not the oncoming vehicle ("No" in step S315), that is, the sensing point is the forward vehicle, the counter value is decreased by 2 (step S316), and the processing is terminated.

The values of the increment and decrement of the counter value or the values of the threshold value A1 and the threshold value A2 are exemplary, and thus may be changed to other values. However, the decrement value of the counter value of the specific sensing point is larger than the decrement value of other sensing point, and the threshold value A1 becomes larger than the threshold value B1.

Figure 10:
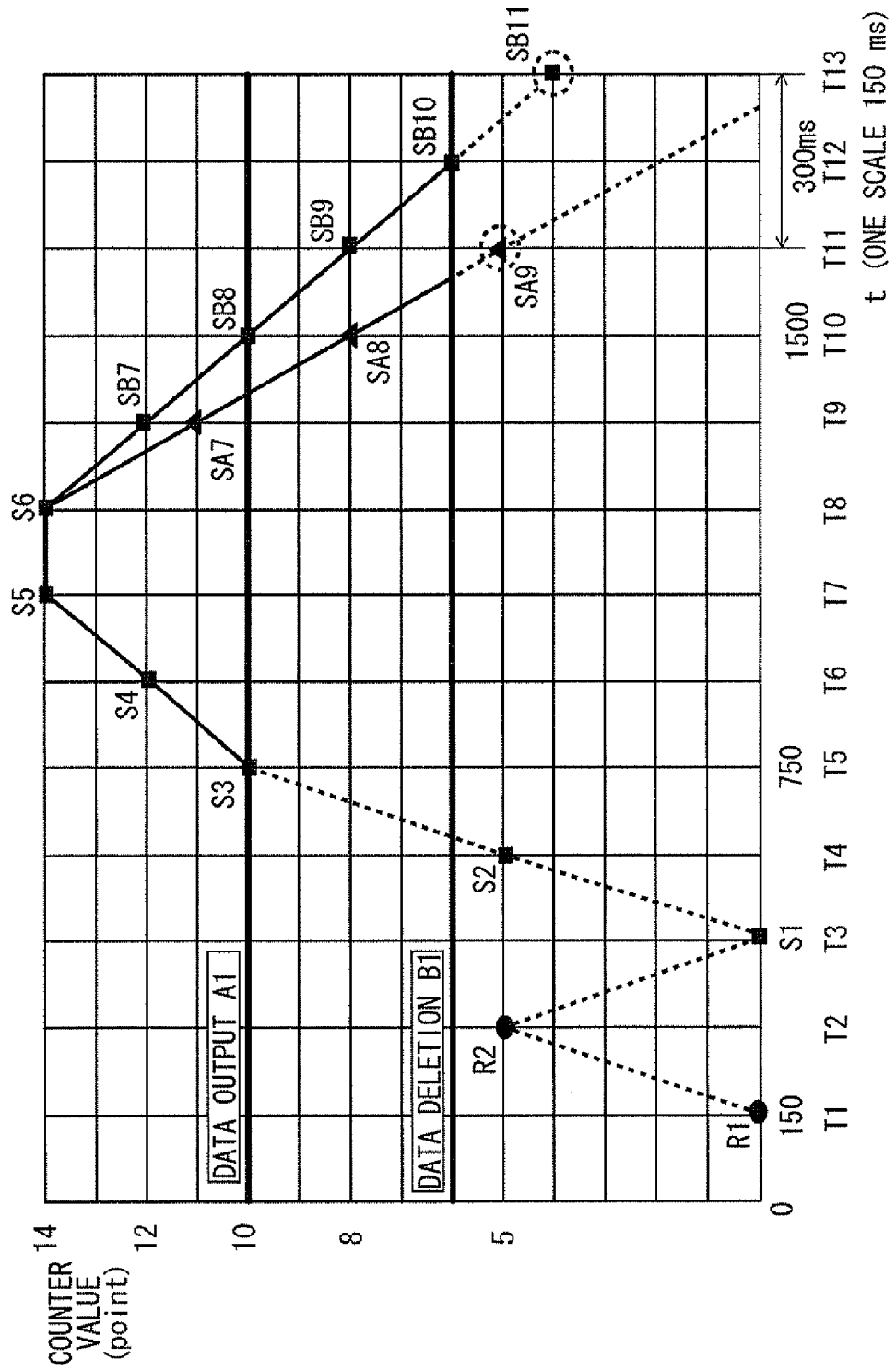
FIG. 10 is a diagram illustrating the change of a counter value of a sensing point in the continuity determination processing in FIG. 9.

FIG. 10 is a diagram illustrating the change of the counter value of the sensing point in the above-described continuity determination processing. The vertical axis represents a counter value, and an upper limit value becomes 14. Further, the horizontal axis represents time where one scale corresponds to one cycle time for the object detection processing. In this embodiment, one cycle is 150 ms.

In the object detection processing of T1 in FIG. 10, a sensing point R1 is detected by the object detection processing, and the signal processing unit 11 stores the data of the sensing point R1 and the counter value 0 of the sensing point R1 in the memory 11b. Further, in the object detection processing of next T2, the recent sensing point R2 having continuity is detected in a case where the sensing point R1 detected in the latest object detection processing of 150 ins (before one cycle) becomes the past sensing point. By the detection of the recent sensing point R2, the counter value of the past sensing point R1 is increased by 5, and the data of the sensing point R2 and the counter value are updated from 0 to 5 to be stored in the memory 11b.

In the object detection processing of T3, the recent sensing point having continuity in a case where the sensing point R2 becomes the past sensing point does not exist, and a newly detected sensing point S1 exists. Because of this, the signal processing unit 11 deletes the data of the past sensing point R2 of the memory 11b and the counter value from the memory 11b, and stores the data of the newly detected sensing point S1 and the counter value 0 in the memory 11b.

Then, in the object detection processing of T4, the recent sensing point S2 having continuity in a case where the sensing point S1 becomes the past sensing point is detected. Because of this, the signal processing unit 11 adds 5 to the counter value 0 of the past sensing point S1, and stores the data of the recent sensing point S2 and the counter value 5 in the memory 11b.

In the object detection processing of T5, the recent sensing point S3 having continuity in a case where the sensing point S2 becomes the past sensing point is detected. Because of this, the signal processing unit 11 adds 5 to the counter value 5 of the past sensing point S2, and stores the data of the recent sensing point S3 and the counter value 10 in the memory 11b. On the other hand, since the counter value of the recent sensing point S3 is equal to or larger than the threshold value A1 that outputs object data constituted using the information of the sensing point to the vehicle control unit 3, the recent sensing point S3 becomes an element constituting the object data and is output to the vehicle control unit 3.

In the object detection processing of T6 and T7, since the past sensing point S3 is continually detected, the recent sensing point becomes S4 at T6, and the data of the sensing point S4 and the counter value 12 that is obtained by adding 2 to the counter value 10 are stored in the memory 11b. Further, at T7, the sensing point S5 becomes the current sensing point with respect to the past sensing point S4, and the data of the sensing point S5 and the counter value 14 that is obtained by adding 2 to the counter value 12 are stored in the memory 11b.

Then, when the continuity to the recent sensing point is not confirmed in a case where the past sensing point becomes S6, the extrapolation processing is performed to hypothetically update the data of the past sensing point on the assumption that the sensing point exists in the predetermined position, and the data is stored in the memory 11b as the recent sensing point to maintain the continuity of the data of the sensing point.

Under the assumption that in the pairing true/false determination processing for the sensing points S1 to S6 having continuity as described above, the specific sensing point possibly detected by pairing the combination of the peak signals in the wrong manner becomes the sensing point after SA7 and the normal sensing point possibly detected by pairing the combination of the peak signals in the normal manner becomes the sensing point after SB7, the change of the respective sensing points thereafter will be described.

When the continuity to the recent sensing point is not confirmed at T9 of the next object detection process in a ease where the past sensing point S6 at T8 is the normal sensing point, the recent sensing point is virtually derived. The counter value of the recent sensing point SB7 virtually derived by the extrapolation processing is obtained by decreasing the original counter value by 2, and the data of the recent sensing point SB7 and the counter value 12 obtained by decreasing the counter value 14 by 2 are stored in the memory 11b.

Thereafter, as the results of the extrapolation processing multiple times after SB8 in a case where the sensing point SB7 becomes the past sensing point, the counter value of the sensing point is decreased by 2 every extrapolation processing, and the data of the sensing point and the counter value are stored in the memory 11b. Further, the data of the sensing point SB11 in a case where the past sensing point at T13 becomes SB10 and the counter value 4 are stored in the memory 11b. The sensing point SB11 is less than the data deletion threshold value B1 that is the threshold value deleting the sensing point data from the memory 11b. Because of this, the data of SB11 obtained by updating the record in the memory 11b at T1 to T13 is deleted from the memory 11b.

Then, returning to the explanation of the object detection processing at T8, if the sensing point S6 is the specific sensing point, the data of the recent sensing point SA7 virtually derived in a case where the specific sensing point S6 becomes the past sensing point and the counter value 11 obtained by decreasing the counter value 14 of the specific sensing point S6 by 3 are stored in the memory 11b.

Thereafter, data of the virtual recent sensing point SA8 at T10 where the specific sensing point SA7 becomes the past sensing point and the counter value 8 are stored in memory 11b. Then, data of the virtual recent sensing point SA9 at T11 where the specific sensing point SA8 becomes the past sensing point and the counter value 5 are stored in memory 11b.

Since the sensing point SA9 stored in the memory 11b is less than the data deletion threshold value B1, the data of the sensing point SA9 is deleted from the memory 11b during scanning at T11. That is, since the decrement value in a case of extrapolating the specific sensing point is larger than the decrement value in a case of extrapolating the normal sensing point, improper vehicle control can be prevented by deleting the specific sensing point possibly detected by pairing the combination of the peak signals in the wrong manner earlier than other sensing points. Specifically, as shown in FIG. 10, the specific sensing point is deleted from the memory 11b at T11, and the normal sensing point is deleted from the memory 11b at T13. That is, the specific sensing point is deleted from the memory 11b earlier than the normal sensing point for 300 ms (object detection processing of 2 cycles).

Further, if the continuity to the specific sensing point S6 is not confirmed in a case where S6 that exceeds the threshold value A1 once or more becomes the specific sensing point, the extrapolation is performed without deleting the data of the specific sensing point from the memory 11b until the data of the specific sensing point becomes less than the threshold value That is, the specific sensing point of the counter value that is less than the threshold value B1 is deleted by decreasing the counter value so that the number of decrements until the counter value of the specific sensing point becomes less than the threshold value B1 is multiple times (in FIG. 10, three times in total including the counter value 12 of SA7 obtained by decreasing the counter value 14 of SA6 by 3, the counter value 8 of SA8 obtained by decreasing the counter value 12 of SA7 by 3, and the counter value 5 of SA9 obtained by decreasing the counter value 8 of SA8 by 3).

Through this, if the specific sensing point is equal to or larger than the threshold value A1 and is output to the vehicle control unit 3, the true/false of the pairing of the specific sensing point can be determined by determining whether the combination of the peak signals is wrong through the processing multiple times without immediately deleting the data of the specific sensing point from the memory 11b even if there is a possibility that the specific sensing point is detected by pairing the combination of the peak signals in the wrong manner.

<2-5. Paring True/False Determination Processing>

Figure 11:
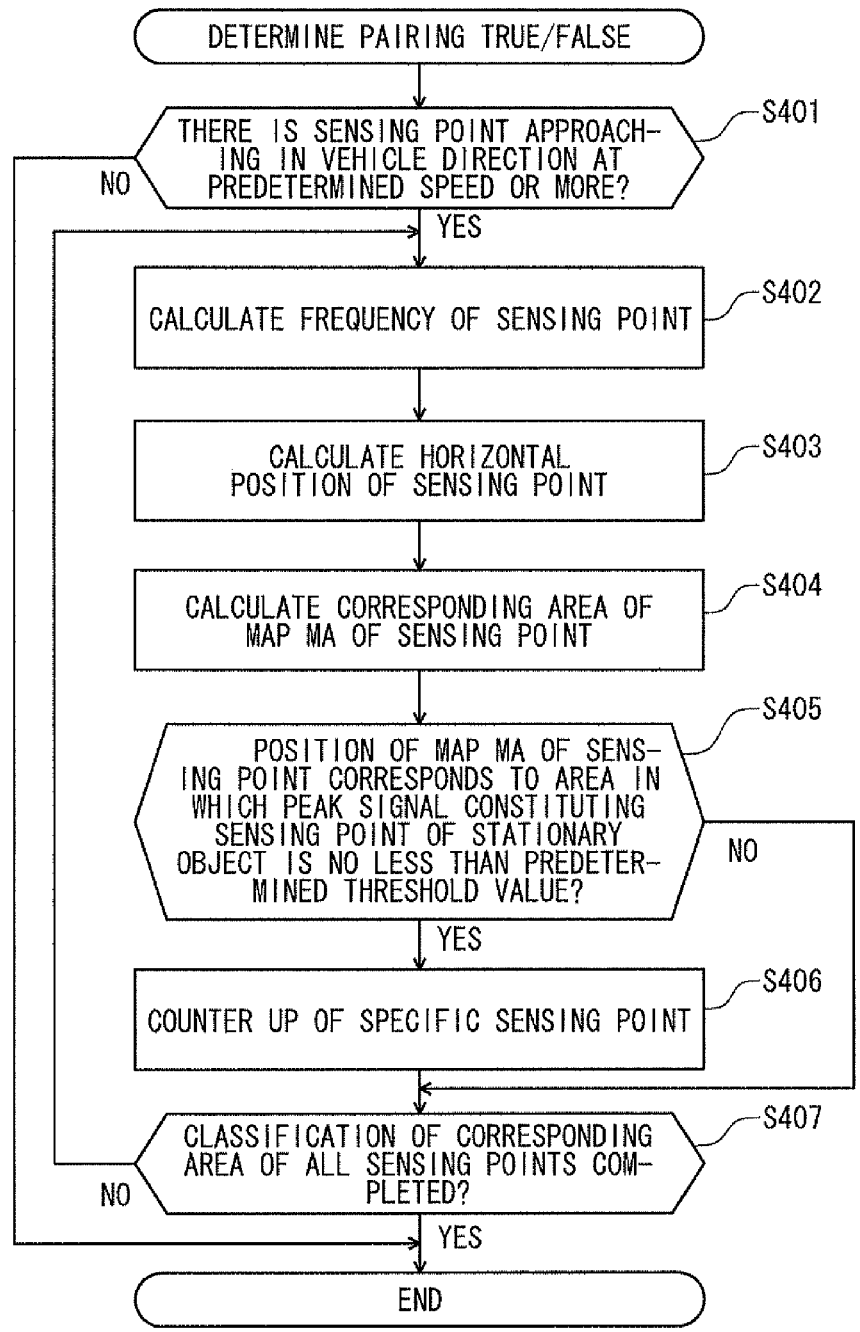
FIG. 11 is a flowchart illustrating the details of pairing true/false determination processing in FIG. 4.
Figure 12:
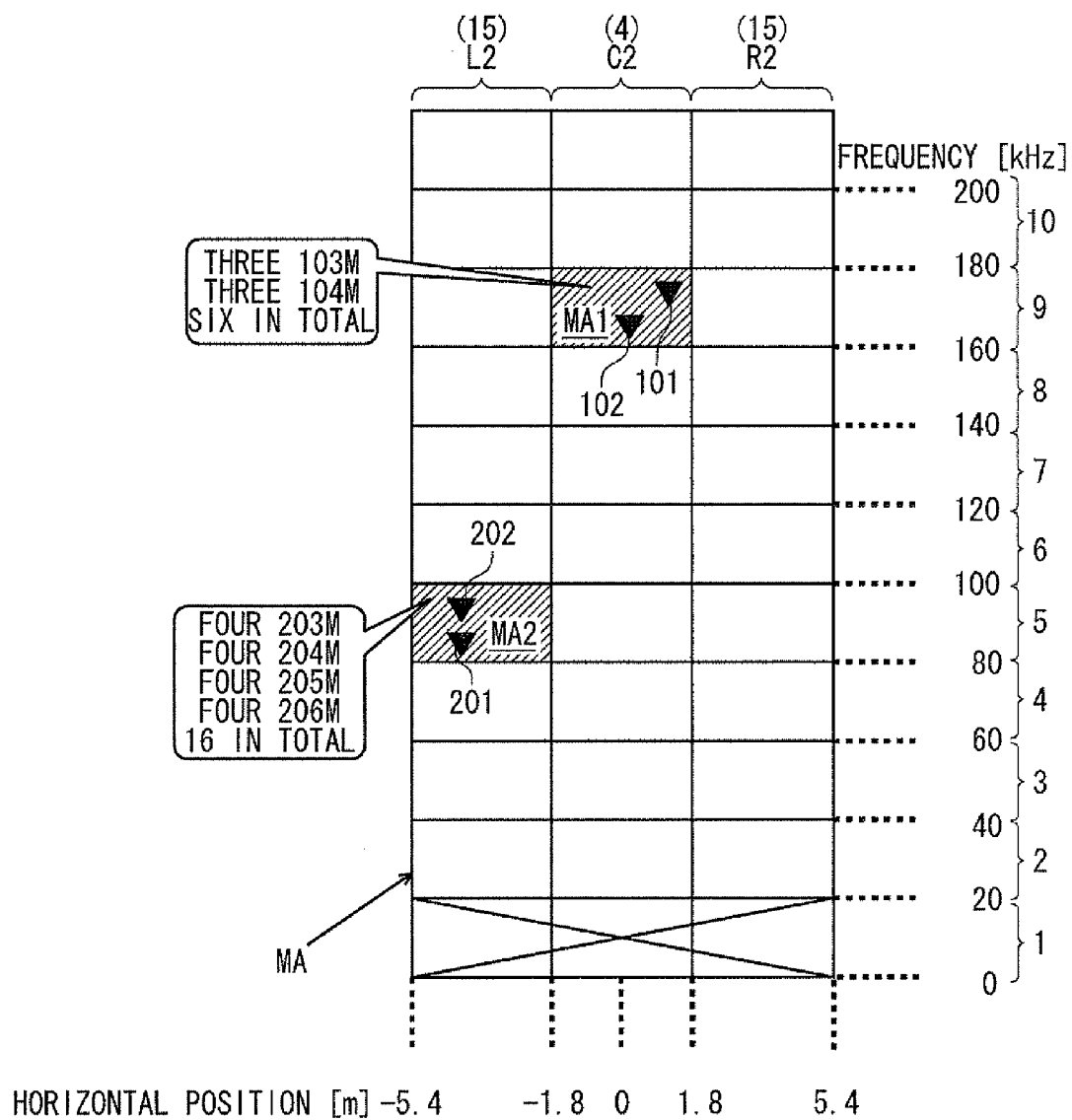
FIG. 12 is a diagram illustrating classification of sensing points of oncoming vehicles on a map in FIG. 11.

The pairing true/false determination processing shown in step S115 of FIG. 4 will be described in detail using FIGS. 11 and 12. FIG. 11 is a flowchart of the pairing true/false determination processing.

In a case where the sensing point detected by the pairing processing in step S105 is not continually detected three times or more ("No" in step S108) and is the sensing point of the moving object ("Yes" in step S109), the pairing true/false determination processing is executed, and it is determined whether the sensing point is the sensing point of an oncoming vehicle that is approaching the direction of the vehicle 1 at a predetermined speed or more (for example, 10 km/h) (step S301).

If there is the sensing point of the oncoming vehicle that is approaching the direction of the vehicle 1 at the predetermined speed or more ("Yes" in step S401), the processing in step S402 is performed. Further, if there is not the sensing point of the oncoming vehicle that is approaching the direction of the vehicle 1 at the predetermined speed or more ("No" in step S401), the processing is terminated.

If the step S401 is "Yes", the frequency of the sensing point of the oncoming vehicle is calculated (step S402). Then, the horizontal position of the sensing point of the oncoming vehicle is calculated (step S403). The frequency calculation is performed using the Expression 2, and the calculation of the horizontal position is performed using the Expression 3 and Expression 4.

Then, using the frequency of the sensing point calculated in steps S402 and S403 and the data of the horizontal position, the corresponding area of the map MA of the sensing point of the oncoming vehicle is calculated (step S404).

If the position of the map MA of the sensing point of the oncoming vehicle is in the area where the peak signal constituting the sensing point of the stationary object classified in the plurality of areas of the map is equal to or larger than the predetermined threshold value ("Yes" in step S405), the sensing point of the oncoming vehicle determined as the specific sensing point becomes the sensing point having high possibility that the target of the pairing processing is wrongly determined, and becomes one of the determination conditions when respective vehicle control units of the vehicle control unit 3 are controlled.

Through this, the true/false of the pairing processing of the sensing portion can be confirmed. Further, by performing the pairing true/false determination with respect to the newly detected sensing point and the sensing point which was first detected last time and is also detected this time, the true/false of the pairing processing can be confirmed early.

On the other hand, in step S405, if the position of the map MA of the sensing point of the oncoming vehicle is not in the area where the peak signal constituting the sensing point of the stationary object classified in the plurality of areas of the map is equal to or larger than the predetermined threshold value ("No" in step S405), or after the count up of the specific sensing point is performed (step 406), it is determined whether the classification of the corresponding areas of the sensing points of all oncoming vehicles has been performed (step S407).

If the classification of the corresponding areas of the sensing points of all oncoming vehicles is performed ("Yes" in step S407), the processing is terminated. Further, if the classification of the corresponding areas of the sensing points of all oncoming vehicles has not been performed ("No" in step S407), the processing returns to the processing in step S402.

The processing of FIG. 11 will be described in detail using FIG. 12. As described above using FIGS. 5 and 8, the map MA is a map in which the peak signals constituting the sensing points of the stationary object are classified. 6 peak signals of group 103M and group 104M in total are classified in the area MA1 of the frequency section 9 and the section C2 of the horizontal position, and 16 peak values of group 203M, group 204M, group 205M, and group 206M in total are classified in the area M2 of the frequency section 5 and the section L2 of the horizontal position.

In the area MA1, the section of the horizontal position is C2, and in this section C2, four threshold values of the peak signals are set. Further, in the area MA2, the section of the horizontal position is L2, and in this section L2, 15 threshold values of the peak signals are set. On the other hand, even with respect to the section R2 of the horizontal position, 15 threshold values of the peak signals are set. Among the threshold values set in the respective sections in the left/right direction (x-axis direction), the threshold values set in the area of L2 or R2 that is an area different from the area of the vehicle 1 is higher than the threshold values set in the area of C2 that is an area that coincides with the vehicle 1. That is, the threshold value of the peak signal constituting the sensing point of the stationary object is set to a high value considering that in the area of the own traffic lane which usually has low probability of the existence of the stationary object, the threshold value of the peak signal constituting the sensing point of the stationary object is set to a low value, and in the area of other traffic lane except for the own traffic lane, the probability of the existence of the stationary object is higher than that on the own traffic lane and the probability of the existence of the oncoming vehicle is high.

As described above, in a state where the peak signals constituting the sensing points of the stationary object are classified and the threshold values are set in the respective areas, respective areas of the map MA of the respective sensing points of the moving object are classified based on the frequency of the sensing points of the moving object and the information on the horizontal position. In FIG. 12, the sensing point 101 and the sensing point 102 detected as the sensing points of the oncoming vehicles are classified in the area MA1, and in the same manner, the sensing point 201 and the sensing point 202 detected as the sensing points of the oncoming vehicles are classified in the area MA2.

Since there are four threshold values of the peak signals of the area MA1 and the number of peak signals constituting the sensing points of the stationary object of the area MA1 is 6, the counter of each specific sensing point is uploaded in the sensing points 201 of the oncoming vehicles and the sensing points 202 of the oncoming vehicles classified in the area MAI.

Further, since there are 15 threshold values of the peak signals of the area MA2 and the number of peak signals constituting the sensing points of the stationary object of the area MA2 is 16, the counter of each specific sensing point is uploaded in the sensing points 201 of the oncoming vehicles and the sensing points 202 of the oncoming vehicles classified in the area MA2. Through this, the true/false of the pairing processing of the sensing points constituting the moving object can be confirmed on both the area that coincides with the own vehicle (for example, the area of the own traffic lane) and the area that is different from the own vehicle (for example, other traffic lanes except for the own traffic lane or an area that deviates from the own traffic lane).

Further, since the threshold value of the areas that are different from the own vehicle is high in comparison to the threshold value of the area of the own vehicle, there is no possibility to take wrong pairing at the sensing point of the oncoming vehicle in the area unlike the own vehicle, which has high possibility of the existence of the oncoming vehicle. Further, since there is a high possibility that the sensing point of the stationary object such as a guard rail or the like exists in the area unlike the own vehicle, the number of peak signals constituting the sensing point of the stationary object exceeds the threshold value in a case where the sensing point of the stationary object exists even if a high threshold value is set.

On the other hand, since the distance between the vehicle 1 and the stationary object that is targeted for detection is short in the frequency section 1 (frequency of 0 kHz to 20 kHz), the peak signals constituting the sensing points of the stationary objects located in section L2 and section R2 may enter into the section C2 or may easily affected by noise, and thus the neighboring area from the vehicle 1 comprised of such sections is decided not to use in the processing according to this embodiment.

Priority is claimed on Japanese Patent Application No. 2010-148806 filed in the Japan Patent Office on Jun. 30, 2010, the contents of which are incorporated herein by reference.

The invention claimed is:

1. A signal processing device configured to perform object detection processing for obtaining a peak signal indicative of a frequency difference between a transmitting signal of which a frequency is cyclically varying and a receiving signal obtained by receiving a reflection wave from an object which reflects a transmission wave based on the transmission signal, for each of a first period in which the frequency of the transmission signal is increasing and a second period in which the frequency is decreasing, and for pairing the peak signal obtained in the first period and the peak signal obtained in the second period, thereby detecting a sensing point indicative of a reflection point on the object associated with the peak signals, the signal processing device comprising:
   a storage section configured to store data indicative of a past sensing point which is the sensing point detected in the object detection processing performed in the past, and a counter value indicative of existence possibility of the past sensing point;
   a determination section configured to determine whether the past sensing point has continuity to a recent sensing point which is the sensing point detected in the object detection processing performed after detecting the past sensing point;
   a decrement section configured to decrease the counter value associated with the past sensing point determined by the determination section as having no continuity to the recent sensing point;
   a deletion section configured to delete, from the storage section, the data indicative of the past sensing point previously stored and associated with the counter value when the counter value become less than a first threshold value;
   an identification section configured to identify a sensing point of a moving object as a wrong paring candidate sensing point possibly detected by pairing the peak signals in a wrong manner if a number of peak signals of the sensing point of the moving object exceeds a threshold value of one of areas in which the moving object is classified, wherein the moving object is classified in the one of the areas on a map, wherein the map includes the areas divided by a predetermined distance in a vertical direction with respect to an own vehicle and predetermined distance in a horizontal direction with respect to the own vehicle and the threshold value of the number of the peak signals is set for each of the areas; and
   a changing section configured to set a decreasing value of the past sensing point identified as a wrong paring candidate sensing point so as to greater than a decreasing value of the other past sensing points.

2. The signal processing device according to claim 1, further comprising:
   an increment section configured to increase the counter value associated with the past sensing point determined by the determination section as having the continuity to the recent sensing point; and
   an output section configured to, in a case where the counter value increased by the increment section is no less than a second threshold value which is larger in value than the first threshold value, output object data which includes information of the sensing point to a vehicle control device for controlling devices equipped in a vehicle,
   wherein the decrement section is configured to decrease the counter value associated with the wrong paring candidate sensing point twice or more until the counter value becomes less than the first threshold value, in a case where the wrong paring candidate sensing point of which the counter value is no less than the second threshold value is determined by the determination section as having no continuity to the recent sensing point.

3. A radar device, comprising:
   the signal processing device according to claim 1; and
   an antenna configured to output the transmission wave, and receive the reflection wave.

4. A vehicle control system, comprising:
   the radar device according to claim 3, which is configured to be equipped in a vehicle; and
   a vehicle controller configured to control devices equipped in the vehicle.

5. A signal processing method configured to perform object detection processing for obtaining a peak signal indicative of a frequency difference between a transmitting signal of which a frequency is cyclically varying and a receiving signal obtained by receiving a reflection wave from an object which reflects a transmission wave based on the transmission signal, for each of a first period in which the frequency of the transmission signal is increasing and a second period in which the frequency is decreasing, and for pairing the peak signal obtained in the first period and the peak signal obtained in the second period, thereby detecting a sensing point indicative of a reflection point on the object associated with the peak signal, the signal processing method comprising:

- storing, in a storage section, data indicative of a past sensing point which is the sensing point detected in the object detection processing performed in the past, and a counter value indicative of existence possibility of the past sensing point;
- determining whether the past sensing point has continuity to a recent sensing point which is the sensing point detected in the object detection processing performed after detecting the past sensing point;
- decreasing the counter value associated with the past sensing point determined by the determining as having no continuity to the recent sensing point;
- deleting, from the storage section, the data previously stored and indicative of the past sensing point associated with the counter value when the counter value becomes less than a first threshold value;
- identifying a sensing point of a moving object as a wrong paring candidate sensing point possibly detected by pairing the peak signals in a wrong manner if a number of peak signals of the sensing point of the moving object exceeds a threshold value of one of areas in which the moving object is classified, wherein the moving object is classified in the one of the areas on a map, wherein the map includes the areas divided by a predetermined distance in a vertical direction with respect to an own vehicle and a predetermined distance in a horizontal direction with respect to the own vehicle and the threshold value of the number of the peak signals is set for each of the areas; and
- setting a decreasing value of the past sensing point identified as the wrong paring candidate sensing point so as to be greater than a decreasing value of the other past sensing points.

* * * * *